(12) United States Patent
Abotabl et al.

(10) Patent No.: US 12,185,331 B2
(45) Date of Patent: Dec. 31, 2024

(54) CONFIGURED GRANT SKIPPING AND REPETITION CONSIDERATIONS IN FULL-DUPLEX NETWORKS

(71) Applicant: QUALCOMM Incorporated, San Diego, CA (US)

(72) Inventors: Ahmed Attia Abotabl, San Diego, CA (US); Muhammad Sayed Khairy Abdelghaffar, San Jose, CA (US); Abdelrahman Mohamed Ahmed Mohamed Ibrahim, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 393 days.

(21) Appl. No.: 17/840,483

(22) Filed: Jun. 14, 2022

(65) Prior Publication Data
US 2023/0403711 A1   Dec. 14, 2023

(51) Int. Cl.
*H04W 72/23* (2023.01)
*H04B 17/336* (2015.01)
*H04L 1/08* (2006.01)
*H04L 5/14* (2006.01)
*H04W 72/21* (2023.01)
*H04W 72/542* (2023.01)

(52) U.S. Cl.
CPC .......... *H04W 72/23* (2023.01); *H04B 17/336* (2015.01); *H04L 1/08* (2013.01); *H04L 5/14* (2013.01); *H04W 72/21* (2023.01); *H04W 72/542* (2023.01)

(58) Field of Classification Search
CPC ... H04W 72/23; H04W 72/542; H04W 72/21; H04B 17/336; H04L 1/08; H04L 5/14
USPC ......................................................... 370/329
See application file for complete search history.

(56) References Cited

U.S. PATENT DOCUMENTS

2021/0314238 A1\* 10/2021 Cioffi .................. H04L 41/5009

FOREIGN PATENT DOCUMENTS

| EP | 3016466 A1 \* | 5/2016 | |
| EP | 3355536 B1 \* | 7/2020 | ............. H04L 47/28 |

\* cited by examiner

*Primary Examiner* — Peter G Solinsky
(74) *Attorney, Agent, or Firm* — Holland & Hart LLP

(57) ABSTRACT

Methods, systems, and devices for wireless communication are described. A user equipment (UE) may determine that an uplink buffer includes data to be communicated in a configured grant based uplink transmission. The UE may identify an interference profile associated with the UE performing the configured grant based uplink transmission. The UE may perform a skipping operation for the configured grant based uplink transmission based at least in part on the data in the uplink buffer and the interference profile, wherein the skipping operation comprises either performing the configured grant based uplink transmission or skipping the configured grant based uplink transmission.

30 Claims, 18 Drawing Sheets

CONFIGURED GRANT SKIPPING AND REPETITION CONSIDERATIONS IN FULL-DUPLEX NETWORKS

FIELD OF TECHNOLOGY

The following relates to wireless communication, including configured grant skipping and repetition considerations in full-duplex networks.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support configured grant (CG) skipping and repetition considerations in full-duplex networks. For example, the described techniques provide for a user equipment (UE) to analyze more than the just the presence or absence of data in its uplink buffer during uplink skipping operations. As a result of analyzing other factors, the UE may still perform skipping operations even when the UE has data in its uplink buffer. For example, the UE may identify or otherwise determine that its uplink buffer has data to be communicated in an uplink transmission, such as a CG based uplink transmission using CG based resources. However, the UE may also identify or otherwise determine an interference profile associated with the UE performing the CG-based uplink transmissions. The interference profile may include self-interference (SI) and/or cross-link interference (CLI) that would be introduced into the channel if the UE performs the CG based uplink transmission to communicate the data in its uplink buffer. The UE may also consider the latency requirements, size, and/or the age of the data stored in the UE's uplink buffer during its skipping operations. Accordingly, the UE may perform its skipping operations (e.g., either perform or skip) for the CG based uplink transmission based on the data stored in its uplink buffer as well as the interference profile. For example, the UE may weight the impact of interference caused by performing the CG based uplink transmission against the data (e.g., latency, size, and/or age) stored in the UE's uplink buffer during its skipping operations.

A method for wireless communication at a UE is described. The method may include determining that an uplink buffer includes data to be communicated in a CG based uplink transmission, identifying an interference profile associated with the UE performing the CG based uplink transmission, and performing a skipping operation for the CG based uplink transmission based on the data in the uplink buffer and the interference profile, where the skipping operation includes either performing the CG based uplink transmission or skipping the CG based uplink transmission.

An apparatus for wireless communication at a UE is described. The apparatus may include a processor, memory coupled with the processor, and instructions stored in the memory. The instructions may be executable by the processor to cause the apparatus to determine that an uplink buffer includes data to be communicated in a CG based uplink transmission, identify an interference profile associated with the UE performing the CG based uplink transmission, and perform a skipping operation for the CG based uplink transmission based on the data in the uplink buffer and the interference profile, where the skipping operation includes either performing the CG based uplink transmission or skipping the CG based uplink transmission.

Another apparatus for wireless communication at a UE is described. The apparatus may include means for determining that an uplink buffer includes data to be communicated in a CG based uplink transmission, means for identifying an interference profile associated with the UE performing the CG based uplink transmission, and means for performing a skipping operation for the CG based uplink transmission based on the data in the uplink buffer and the interference profile, where the skipping operation includes either performing the CG based uplink transmission or skipping the CG based uplink transmission.

A non-transitory computer-readable medium storing code for wireless communication at a UE is described. The code may include instructions executable by a processor to determine that an uplink buffer includes data to be communicated in a CG based uplink transmission, identify an interference profile associated with the UE performing the CG based uplink transmission, and perform a skipping operation for the CG based uplink transmission based on the data in the uplink buffer and the interference profile, where the skipping operation includes either performing the CG based uplink transmission or skipping the CG based uplink transmission.

Some examples of the method, apparatuses, and non-transitory computer-readable medium described herein may further include operations, features, means, or instructions for identifying a latency parameter, a size parameter, or both, for the data, where the skipping operation may be further based on the latency parameter, the size parameter, or both, for the data.

Some examples of the method, apparatuses, and non-transitory computer-readable medium described herein may further include operations, features, means, or instructions for receiving an indication of a metric to use when performing the skipping operation, where the metric defines the skipping operation as comparing the latency parameter, the size parameter, or both, to the interference profile associated with the UE performing the CG based uplink transmission.

In some examples of the method, apparatuses, and non-transitory computer-readable medium described herein, identifying the interference profile may include operations, features, means, or instructions for identifying a SI parameter associated with the UE performing the CG based uplink transmission, where the interference profile may be based on the SI parameter.

Some examples of the method, apparatuses, and non-transitory computer-readable medium described herein may further include operations, features, means, or instructions for receiving an indication of a SI threshold for the CG based uplink transmission and comparing the SI parameter to the SI threshold, where the skipping operation may be based on a result of the comparing.

In some examples of the method, apparatuses, and non-transitory computer-readable medium described herein, the skipping operation includes performing the CG based uplink transmission when the SI parameter may be below the SI threshold and skipping the CG based uplink transmission when the SI parameter may be at or above the SI threshold.

Some examples of the method, apparatuses, and non-transitory computer-readable medium described herein may further include operations, features, means, or instructions for identifying the SI parameter based on the UE operating in a full-duplex communication mode concurrently with performing the CG based uplink transmission.

In some examples of the method, apparatuses, and non-transitory computer-readable medium described herein, identifying the interference profile may include operations, features, means, or instructions for identifying a CLI parameter associated with the UE performing the CG based uplink transmission at a transmit power level, where the interference profile may be based on the CLI parameter.

Some examples of the method, apparatuses, and non-transitory computer-readable medium described herein may further include operations, features, means, or instructions for receiving an indication of a CLI threshold for the configured-grant based uplink transmission and comparing the CLI parameter for the CG based uplink transmission to the CLI threshold, where the skipping operation may be based on a result of the comparing.

In some examples of the method, apparatuses, and non-transitory computer-readable medium described herein, the skipping operation includes performing the CG based uplink transmission when the CLI parameter for the CG based uplink transmission at the transmit power level may be below the CLI threshold and skipping the CG based uplink transmission at the transmit power level when the CLI parameter may be at or above the CLI threshold.

In some examples of the method, apparatuses, and non-transitory computer-readable medium described herein, the CLI parameter may be based on a CLI level introduced by the UE performing the CG based uplink transmission at the transmit power level and the CLI threshold defines a maximum transmit power level corresponding to a maximum CLI level.

Some examples of the method, apparatuses, and non-transitory computer-readable medium described herein may further include operations, features, means, or instructions for identifying the CLI parameter based on one or more neighboring devices operating in a full-duplex communication mode concurrently with the UE performing the CG based uplink transmission.

Some examples of the method, apparatuses, and non-transitory computer-readable medium described herein may further include operations, features, means, or instructions for receiving a signal configuring a set of uplink resources available for the UE to perform CG based uplink transmissions.

Some examples of the method, apparatuses, and non-transitory computer-readable medium described herein may further include operations, features, means, or instructions for identifying, based on the signal, a metric defining first repetition factor for uplink resources in the set of uplink resources within a full-duplex slot that may be different from a second repetition factor for uplink resources in the set of uplink resources within a half-duplex slot.

Some examples of the method, apparatuses, and non-transitory computer-readable medium described herein may further include operations, features, means, or instructions for identifying, based on the signal, a metric defining a repetition factor for the set of uplink resources based on a frequency gap between uplink resources for the CG based uplink transmission and downlink resources within a slot.

In some examples of the method, apparatuses, and non-transitory computer-readable medium described herein, the metric includes at least one of a table defining a fixed relation between the repetition factor and the frequency gap, a weighting factor applied to the frequency gap to define the repetition factor, or both.

Some examples of the method, apparatuses, and non-transitory computer-readable medium described herein may further include operations, features, means, or instructions for identifying, based on the signal, a metric defining a transmit power level of each CG based uplink transmission repetition, where a repetition factor may be based on the transmit power level of each CG based uplink transmission.

A method for wireless communication at a network entity is described. The method may include transmitting, to a UE, a signal configuring a set of uplink resources available for the UE to use to perform CG based uplink transmissions, transmitting an indication of an interference profile threshold for the UE to use when performing skipping operations on the CG based uplink transmissions, and receiving one or more CG based uplink transmissions on the set of uplink resources according to the skipping operations applied by the UE, where the skipping operations include the UE either performing at least a portion of the CG based uplink transmissions or skipping the at least the portion of the CG based uplink transmissions.

An apparatus for wireless communication at a network entity is described. The apparatus may include a processor, memory coupled with the processor, and instructions stored in the memory. The instructions may be executable by the processor to cause the apparatus to transmit, to a UE, a signal configuring a set of uplink resources available for the UE to use to perform CG based uplink transmissions, transmit an indication of an interference profile threshold for the UE to use when performing skipping operations on the CG based uplink transmissions, and receive one or more CG based uplink transmissions on the set of uplink resources according to the skipping operations applied by the UE, where the skipping operations include the UE either performing at least a portion of the CG based uplink transmissions or skipping the at least the portion of the CG based uplink transmissions.

Another apparatus for wireless communication at a network entity is described. The apparatus may include means for transmitting, to a UE, a signal configuring a set of uplink resources available for the UE to use to perform CG based uplink transmissions, means for transmitting an indication of an interference profile threshold for the UE to use when performing skipping operations on the CG based uplink transmissions, and means for receiving one or more CG based uplink transmissions on the set of uplink resources according to the skipping operations applied by the UE, where the skipping operations include the UE either performing at least a portion of the CG based uplink transmissions or skipping the at least the portion of the CG based uplink transmissions.

A non-transitory computer-readable medium storing code for wireless communication at a network entity is described. The code may include instructions executable by a processor to transmit, to a UE, a signal configuring a set of uplink resources available for the UE to use to perform CG based uplink transmissions, transmit an indication of an interference profile threshold for the UE to use when performing skipping operations on the CG based uplink transmissions, and receive one or more CG based uplink transmissions on the set of uplink resources according to the skipping operations applied by the UE, where the skipping operations include the UE either performing at least a portion of the CG based uplink transmissions or skipping the at least the portion of the CG based uplink transmissions.

In some examples of the method, apparatuses, and non-transitory computer-readable medium described herein, transmitting the indication of the interference profile threshold may include operations, features, means, or instructions for transmitting an indication of a metric that defines the skipping operations as the UE comparing a latency parameter, a size parameter, or both, for data in an uplink buffer of the UE to an interference profile associated with the UE performing a CG based uplink transmission.

In some examples of the method, apparatuses, and non-transitory computer-readable medium described herein, transmitting the indication of the interference profile threshold may include operations, features, means, or instructions for transmitting an indication of a SI threshold for a CG based uplink transmission from the UE, where the skipping operations may be based on the SI threshold.

In some examples of the method, apparatuses, and non-transitory computer-readable medium described herein, transmitting the indication of the interference profile threshold may include operations, features, means, or instructions for transmitting an indication of a CLI threshold for a CG based uplink transmission from the UE, where the skipping operations may be based on the CLI threshold.

In some examples of the method, apparatuses, and non-transitory computer-readable medium described herein, transmitting the signal configuring the set of uplink resources may include operations, features, means, or instructions for transmitting a metric defining first repetition factor for uplink resources in the set of uplink resources within a full-duplex slot that may be different from a second repetition factor for uplink resources in the set of uplink resources within a half-duplex slot.

In some examples of the method, apparatuses, and non-transitory computer-readable medium described herein, transmitting the signal configuring the set of uplink resources may include operations, features, means, or instructions for transmitting a metric defining a repetition factor for the set of uplink resources based on a frequency gap between uplink resources for the CG based uplink transmissions and downlink resources within a slot.

In some examples of the method, apparatuses, and non-transitory computer-readable medium described herein, the metric includes at least one of a table defining a fixed relation between the repetition factor and the frequency gap, a weighting factor applied to the frequency gap to define the repetition factor, or both.

In some examples of the method, apparatuses, and non-transitory computer-readable medium described herein, transmitting the signal configuring the set of uplink resources may include operations, features, means, or instructions for transmitting a metric defining a transmit power level of each CG based uplink transmission repetition, where a repetition factor may be based on the transmit power level of each CG based uplink transmission.

DETAILED DESCRIPTION

Wireless networks may support skipping operations at a user equipment (UE) where the UE skips (e.g., does not perform or otherwise refrains from performing) an uplink transmission using configured grant (CG) based uplink resources. For example, the UE may be provided with CG configurations identifying CG resources available for the UE to use to perform a CG based uplink transmission. However, the UE may not always have data in its uplink buffer. Based on the absence of data in the uplink buffer, the UE may determine to skip an uplink transmission using the CG resources rather than perform a blank or NULL uplink transmission carrying no data. However, such techniques do not provide a mechanism for a UE to consider other factors in addition to just whether or not there is data in its uplink buffer during its skipping operations.

Accordingly, aspects of the described techniques provide for a UE to analyze more than the just the presence or absence of data in its uplink buffer during uplink skipping operations. As a result of analyzing other factors, the UE may still perform skipping operations even when the UE has data in its uplink buffer. For example, the UE may identify or otherwise determine that its uplink buffer has data to be communicated in an uplink transmission, such as a CG based uplink transmission using CG based resources. However, the UE may also identify or otherwise determine an interference profile associated with the UE performing the CG-based uplink transmissions. The interference profile may include self-interference (SI) and/or cross-link interference (CLI) that would be introduced if the UE performs the CG based uplink transmission to communicate the data in its uplink buffer. The UE may also consider the latency requirements, the size or amount, and/or the age of the data stored in the UE's uplink buffer during its skipping operations. Accordingly, the UE may perform its skipping operations (e.g., either perform or skip) for the CG based uplink transmission based on the data stored in its uplink buffer as well as the interference profile. For example, the UE may weight the impact of interference caused by performing the CG based uplink transmission against the data (e.g., latency, size, and/or age) stored in the UE's uplink buffer during its skipping operations.

Aspects of the disclosure are initially described in the context of wireless communications systems. Aspects of the disclosure are further illustrated by and described with reference to apparatus diagrams, system diagrams, and flowcharts that relate to CG skipping and repetition considerations in full-duplex networks.

Figure 1:
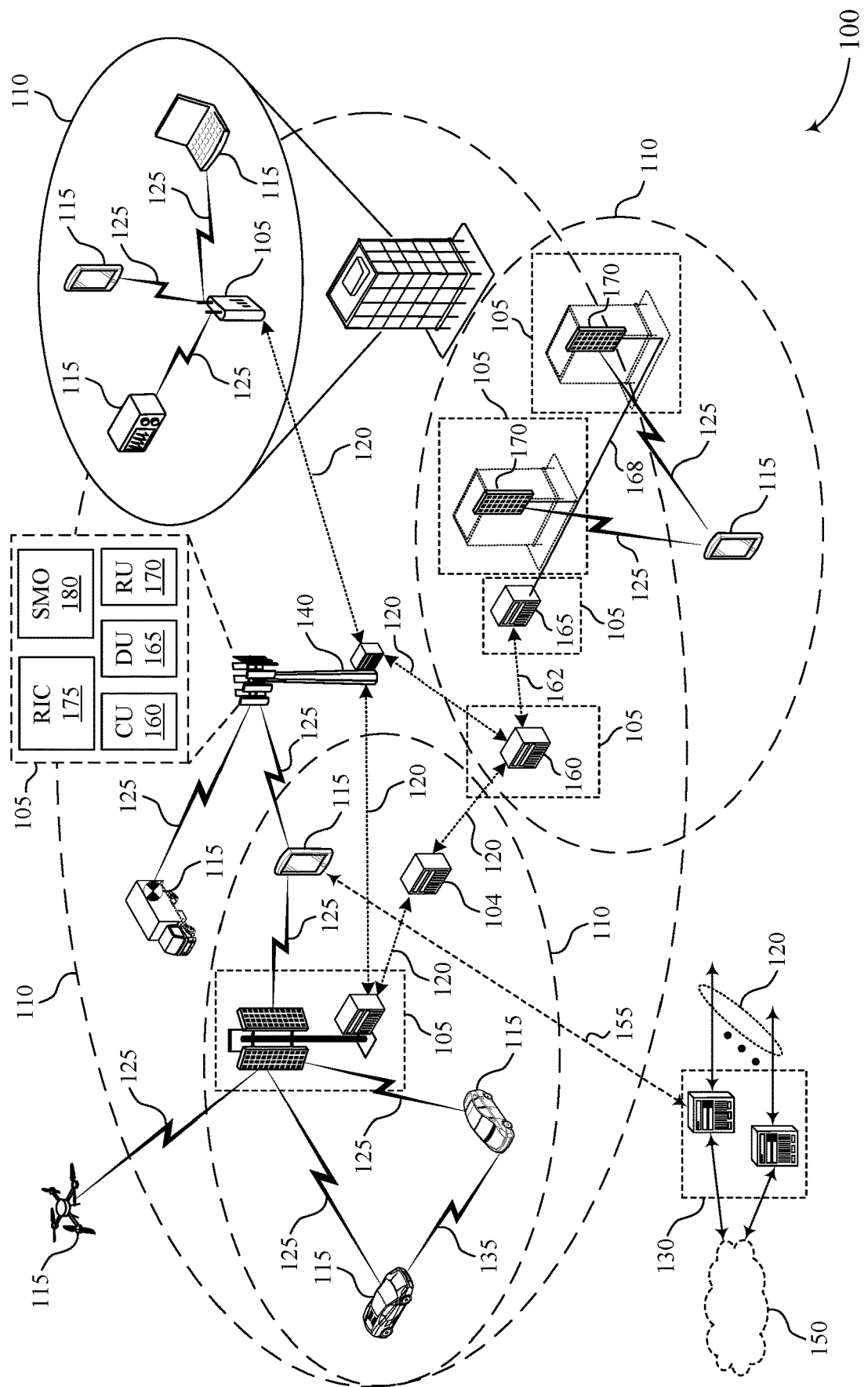
FIG. 1 illustrates an example of a wireless communications system that supports configured grant (CG) skipping and repetition considerations in full-duplex networks in accordance with one or more aspects of the present disclosure.

FIG. 1 illustrates an example of a wireless communications system 100 that supports CG skipping and repetition considerations in full-duplex networks in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending upon which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support CG skipping and repetition considerations in full-duplex networks as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and N f may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more sub-bands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

A UE 115 may determine that an uplink buffer includes data to be communicated in a CG based uplink transmission. The UE 115 may identify an interference profile associated with the UE performing the CG based uplink transmission. The UE 115 may perform a skipping operation for the CG based uplink transmission based at least in part on the data in the uplink buffer and the interference profile, wherein the skipping operation comprises either performing the CG based uplink transmission or skipping the CG based uplink transmission.

A network entity 105 may transmit, to a UE 115, a signal configuring a set of uplink resources available for the UE 115 to use to perform CG based uplink transmissions. The network entity 105 may transmit an indication of an interference profile threshold for the UE 115 to use when performing skipping operations on the CG based uplink transmissions. The network entity 105 may receive one or more CG based uplink transmissions on the set of uplink resources according to the skipping operations applied by the UE 115, wherein the skipping operations comprise the UE 115 either performing at least a portion of the CG based uplink transmissions or skipping the at least the portion of the CG based uplink transmissions.

Figure 2:
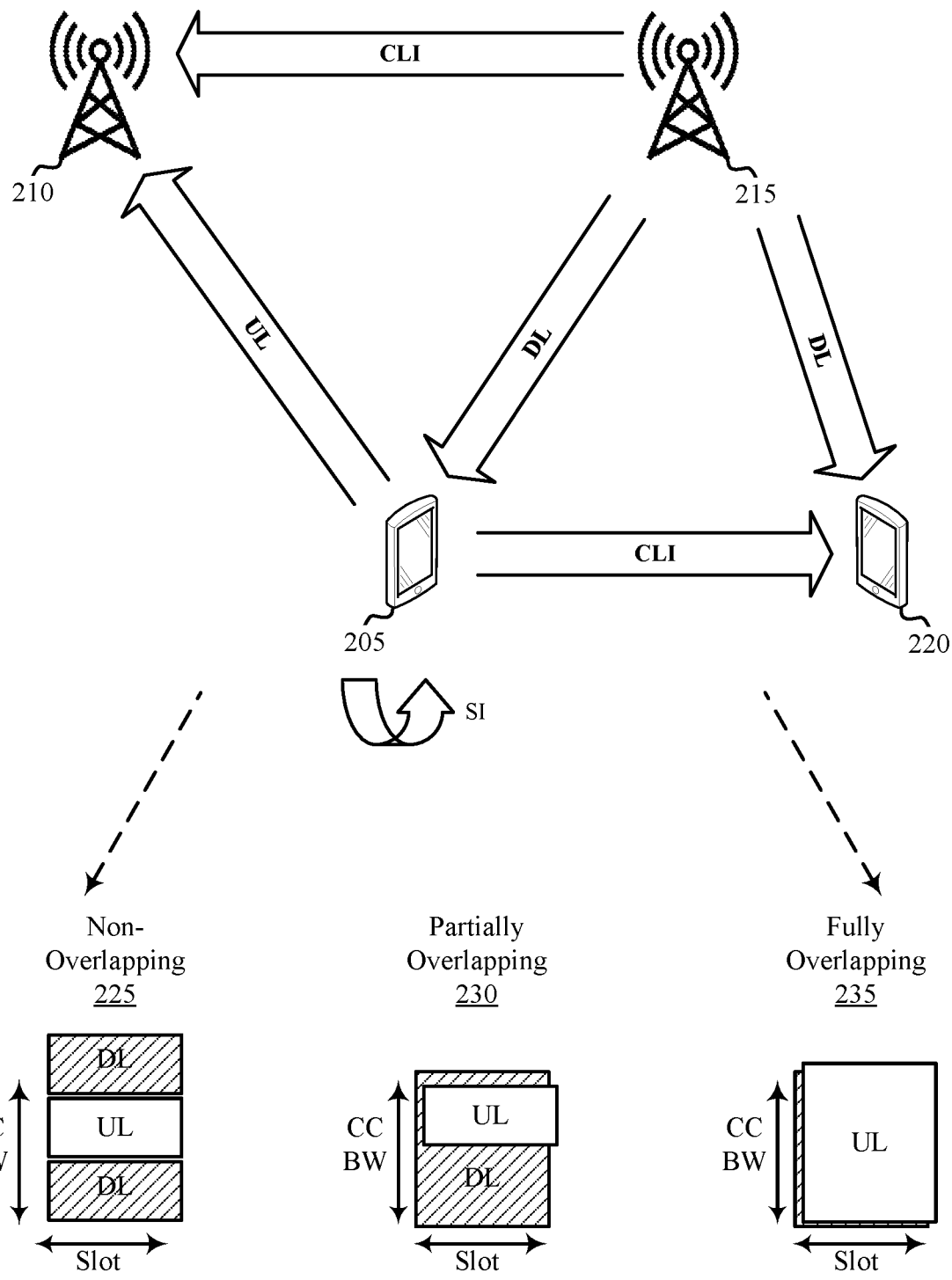
FIG. 2 illustrates an example of a wireless communications system that supports CG skipping and repetition considerations in full-duplex networks in accordance with one or more aspects of the present disclosure.

FIG. 2 illustrates an example of a wireless communications system 200 that supports CG skipping and repetition considerations in full-duplex networks in accordance with one or more aspects of the present disclosure. Wireless communications system 200 may implement aspects of wireless communications system 100. Wireless communications system 200 may include UE 205, network entity 210, network entity 215, and/or UE 220, which may be examples of the corresponding devices described herein.

Wireless communications system 200 may support full-duplex communications. For example, UE 205 may support or otherwise be configured to receive or otherwise obtains a downlink (DL) transmission from network entity 215 while, at the same time, performing an uplink (UL) transmission to network entity 210. Network entity 215 may also perform a downlink transmission to UE 220, which may be a neighboring UE with respect to UE 205 (e.g., at the same time or at a different time as performing the downlink transmission to UE 205).

One non-limiting example of full-duplex communications may include sub-band full-duplex (SBFD) (also referred to as "flexible duplex") where the same time resources (e.g., within a slot) are used, but different frequency resources (e.g., within the bandwidth (BW) of a CC) are used for the communications. For example, the downlink and uplink communications may share the same time resources (e.g., be performed at the same time, at least to some degree), but the uplink communications may use different frequency resources than the downlink communications. One example of such SBFD may include non-overlapping configuration 225 where the uplink and downlink communications are performed at the same time, but using different frequency resources. In some aspects, the downlink resources (e.g., the frequency resources used for the downlink communications) may be separated from the uplink resources (e.g., the frequency resources used for the uplink communications) in the frequency domain (e.g., there may be a frequency gap between uplink frequency resources and downlink frequency resources).

Another non-limiting example of full-duplex communications may include in-band full-duplex (IBFD) where the same time and/or frequency resources are used for the communications, at least to some degree. For example, the downlink and uplink communications (e.g., the full-duplex communications) may share some or all of the same time and/or frequency resources. One example of such IBFD may include partially overlapping configuration 230 where at least of the time and/or frequency resources used for the full-duplex operations overlap. Another example of such IBFD may include fully overlapping configuration 235 where all of the time and/or frequency resources used for the full-duplex operations overlap.

A slot format is generally defined as a downlink-plus-uplink slot in which the band (e.g., frequency resources) is used for both uplink and downlink communications. The downlink and uplink communications may occur in overlapping bands (e.g., IBFD) or in adjacent bands (e.g., SBFD). In a given symbol of a downlink-plus-uplink slot, a UE supporting half-duplex communications may either perform an uplink transmission in the uplink frequency resources or receive a downlink transmission in the downlink frequency resources. In a given symbol of a downlink-plus-uplink slot, a UE supporting full-duplex communications may both perform an uplink transmission in the uplink frequency resources and/or receive a downlink transmission in the downlink frequency resources. A given downlink-plus-uplink slot may include downlink only symbols, uplink only symbols, or full-duplex symbols.

However, communications within any wireless communication system are generally associated with introducing interference into the network. That is, any device within wireless communications system 200 performing a transmission introduces at least some degree of interference into the network (e.g., interference that may then impact and/or must then be mitigated by other devices within the network). Two non-limiting examples of such interference include CLI and SI.

CLI is broadly defined as interference caused by or otherwise introduced into the network by another device performing a wireless transmission. For example, inter-cell interference may be caused by or otherwise associated with CLI caused by other network entities. For example, network entity 215 may introduce inter-cell interference from the perspective of network entity 210 when network entity 215 performs the downlink transmissions to UE 205 and/or UE 220. Intra-cell CLI may generally be associated with inter-ference from UEs within the same cell where inter-cell CLI may generally be associated with interference from UEs in adjacent cells. For example, UE 205 may introduce CLI (e.g., intra-cell or inter-cell CLI) into the network from the perspective UE 220 when performing the uplink transmission to network entity 210.

SI is broadly defined as interference caused to a device by that device performing full-duplex communications. That is, a device (such as UE 205) configured to or otherwise supporting performing full-duplex communications may include separate transmit and receive chains (including antenna(s)) enabling the device to perform a transmission while also receiving a different transmission. The transmission being performed introduces SI into the receive chain (e.g., including antenna(s)) being used to receive the transmission.

In the SBFD scenario, the network entity may configure a downlink transmission to a UE in frequency domain resources adjacent to the frequency domain resources configured for an uplink transmission performed by another UE. For example, in the SBFD scenario, in a slot a first UE may be configured to perform an uplink transmission in a middle portion of the frequency band while a second UE may be configured to receive a downlink transmission from a network entity in adjacent frequency resources. The uplink transmission of the first UE cause CLI to the downlink reception at the second UE. Generally, CLI may be due to energy leakage caused by timing and frequency mis-alignment between the two UEs, or due to automatic gain control (AGC) mismatch if the AGC of the second UE is driven by a downlink serving cell signal, but the CLI is strong enough to saturate the AGC of the first UE.

In some examples, the uplink transmissions may be CG-based uplink transmissions. For example, a serving network entity may generally transmit or otherwise provide UE(s) with CG configuration(s) that each define resources (e.g., time resources, frequency resources, spatial resources, code resources, etc.) as well as the configuration parameters for those resources (e.g., MCS, transmit power level, periodicity, repetition, etc.). A UE with data in its uplink buffer may identify or otherwise select a CG configuration to perform an CG based uplink transmission to convey the data stored in its uplink buffer. More particularly, the UE may autonomously select the CG configuration to use for the CG based uplink transmission (e.g., a non-DCI activated CG configuration) or may receive a grant from the network entity identifying the CG configuration to use (e.g., a DCI activated CG configuration).

One feature defined within CG configuration(s) may include skipping operations where a UE skips (e.g., does not perform) an uplink transmission using the CG configuration/resources. Conventionally, the skipping operations may be based on the status of the uplink buffer of the UE. For example, conventional networks permit the UE to skip a CG based uplink transmission if there is no data stored in the UE's uplink buffer. However, such conventional networks do not provide a mechanism or otherwise support a UE performing skipping operations for CG based uplink transmissions when the UE has data stored or otherwise available for transmitting in a CG based uplink transmission.

For example and in a half-duplex slot, a UE performing a CG based uplink transmission may not give any consideration for CLI or SI. However, in a full-duplex slot where a UE supports full-duplex communications, the uplink transmission may impact (e.g., SI) the downlink reception, in addition to inter-UE CLI. In a full-duplex slot where a UE is aware that full-duplex communications are being performed by other devices, the uplink transmission may have an adverse effect on the CLI. In conventional networks, skipping operations for CG based uplink transmissions (e.g., CG skipping) may be used to not transmit anything in case the UL buffer is empty.

However, aspects of the techniques described herein may support such skipping operations being used to cancel CG based uplink transmission(s) according to events that are known only at the UE side. Examples of these events include, but are not limited to, a remaining SI (e.g., a SI threshold) and/or how the calculated transmit power to be used for the CG based uplink transmission would impact CLI. This may support skipping operations for the CG based uplink transmission based on the two dimensions of status of the uplink buffer of the UE as well as the interference impact (e.g., the interference profile associated with the UE performing the CG based uplink transmission. Uplink skipping may be allowed according to a configured trade-off between the uplink buffer and the interference profile. This may include the UE also informing the network implicitly that its transmission parameters are not very well suited with CLI and SI parameters so that the network may re-configure the uplink-CG parameters in a FD slot. Also, CG skipping operations may also be addressed with different repetitions of an uplink CG resource to protect against CLI and SI.

For example, UE 205 (in this example) may identify or otherwise determine that an uplink buffer includes data to be communicated on a CG based uplink transmission. UE 205 may include one or more uplink buffers obtaining data from various applications, functions, sensors, etc., of or otherwise associated with UE 205. The data being obtained by an uplink buffer of UE 205 may indicate that the uplink transmission is to be performed.

UE 205 may be provided with CG configuration(s) by network entity 210 (in this example) that identify or otherwise indicate (e.g., using RRC signaling) uplink resources as well as various configuration parameters to be used for uplink transmissions using the CG based uplink resources. UE 205 may identify or otherwise select a CG configuration to use for the uplink transmission conveying the data stored in the uplink buffer of UE 205 (e.g., autonomously or based on an activating DCI). Accordingly, UE 205 may identify or otherwise determine to perform the uplink transmission using the CG configuration to convey the data stored in the uplink buffer of UE 205 to network entity 210.

Conventionally, wireless networks would not support or otherwise configure UE 205 to perform skipping operations for CG based uplink transmissions when there is data stored in the uplink buffer of UE 205. However, aspects of the techniques described herein provide various mechanisms for UE 205 to identify or otherwise determine an interference profile associated with UE 205 performing the CG based uplink transmission and then perform skipping operations for the CG based uplink transmission based on the data in the uplink buffer and/or the interference profile.

Broadly, the interference profile corresponds to the interference impact introduced into the network caused by UE 205 performing the uplink transmission using the CG configuration resources (e.g., CLI and/or SI).

As one non-limiting example, this may include UE 205 identifying or otherwise determining a SI parameter associated with UE 205 performing the CG based uplink transmission. That is, UE 205 may identify or otherwise determine the amount of interference (SI) that would be introduced into receiving a downlink transmission if UE 205 were to perform the CG based uplink transmission at the same time (e.g., when performing full-duplex communications using the CG based uplink resources). For example, UE 205 may identify or otherwise determine a transmit power at which the CG based uplink transmission is to be performed at and identify or otherwise determine the SI parameter for the CG based uplink transmission at that transmit power.

If UE 205 identifies, estimates, or otherwise determines that the SI parameter associated with performing the CG based uplink transmission negatively impacts receiving the downlink transmission at or above a threshold (e.g., a SI threshold), then the skipping operation may include UE 205 skipping (e.g., not performing) the CG based uplink transmission. If UE 205 identifies, estimates, or otherwise determines that the SI associated with performing the CG based uplink transmission does not negatively impact receiving the downlink transmission at or above the threshold (e.g., below the SI threshold), then the skipping operation may include UE 205 performing the CG based uplink transmission. For example, UE 205 may compare the SI parameter to a SI threshold during the skipping operations.

In some examples, UE 205 may autonomously identify, select, or otherwise determine the SI threshold. For example, UE 205 may identify or otherwise determine an acceptable interference level that will still permit UE 205 to successfully receive and decode the downlink transmission. UE 205 may set or otherwise identify the SI threshold based on the acceptable interference level. In other examples, UE 205 may be configured with the SI threshold. For example, UE 205 may receive or otherwise obtain an indication of the SI threshold for the CG based uplink transmission from network entity 210 (e.g., via RRC signaling, MAC control element (CE) signaling, and/or DCI signaling).

Additionally, or alternatively, this may include UE 205 identifying or otherwise determining a CLI parameter associated with UE 205 performing the CG based uplink transmission. That is, UE 205 may identify or otherwise determine the amount of interference (CLI) that would be introduced into the network if UE 205 were to perform the CG based uplink transmission. For example, UE 205 may identify or otherwise determine a transmit power at which the CG based uplink transmission is to be performed at and identify or otherwise determine the CLI parameter for the CG based uplink transmission at that transmit power.

If UE 205 identifies, estimates, or otherwise determines that the CLI parameter associated with performing the CG based uplink transmission negatively impacts the network at or above a threshold (e.g., a CLI threshold), then the skipping operation may include UE 205 skipping (e.g., not performing) the CG based uplink transmission. If UE 205 identifies, estimates, or otherwise determines that the CLI associated with performing the CG based uplink transmission does not negatively impact the network at or above the threshold (e.g., below the CLI threshold), then the skipping operation may include UE 205 performing the CG based uplink transmission. For example, UE 205 may compare the CLI parameter for the CG based uplink transmission to a CLI threshold during the skipping operations.

In some examples, UE 205 may autonomously identify, select, or otherwise determine the CLI threshold. For example, UE 205 may be aware that other devices are operating nearby (e.g., within a geographical distance threshold) and therefore identify or otherwise determine an acceptable interference level that can be introduced into the network (e.g., without negatively impacting communications between the adjacent devices). In some examples, the adjacent communications impacted by the CLI may be full-duplex communications, although the described techniques are not limited to this situation. UE 205 may set or otherwise identify the CLI threshold based on the acceptable interference level. In other examples, UE 205 may be configured with the CLI threshold. For example, UE 205 may receive or otherwise obtain an indication of the CLI threshold for the CG based uplink transmission from network entity 210 (e.g., via RRC signaling, MAC CE signaling, and/or DCI signaling).

Accordingly, aspects of the techniques described herein support, since the network may not be aware of the CLI or SI resulting from a CG based uplink transmission in a full-duplex slot, the network may configure 205 (RRC configured, MAC CE configured, or indicated in DCI) with skipping operations support. In the situation where UE 205 is operating in the full-duplex mode, this may include the network configuring a remaining SI threshold (e.g., the SI threshold) such that if the expected SI is higher than a given threshold and UE 205 is expecting a downlink reception at the same time, then UE 205 may skip this CG based uplink transmission instance. In the situation where UE 205 is aware of adjacent devices performing full-duplex communications, this may include the network configuring UE 205 with a threshold on the transmit power and if the transmit power of this CG based uplink transmission is exceeded, then UE 205 may skip this CG based uplink transmission instance.

In some aspects, UE 205 performing skipping operations when there is data in its uplink buffer raised additional uplink buffer considerations. In the situation where the skipping operations include UE 205 skipping a CG based uplink transmission, this may increase the amount of data stored in the uplink buffer (rather than being emptied) as well as increase the latency of the data. Accordingly, aspects of the techniques described herein provide a mechanism where UE 205 considers the trade-off between skipping and performing the CG based uplink transmission.

For example, UE 205 may identify or otherwise determine a latency parameter (e.g., the latency requirements), a size parameter (e.g., how much data is in the uplink buffer), and/or an age parameter (how long has the data been stored in the uplink buffer) for the CG based uplink transmission. The skipping operations performed by UE 205 for CG based uplink transmissions may be further based on the latency/size/age parameters for the data stored in the uplink buffer. For example, UE 205 may receive or otherwise obtain an indication of a metric to be used for the skipping operations. The metric may broadly define the skipping operations as comparing the latency/size/age parameters of the data to the interference profile.

Accordingly, UE 205 may be configured (e.g., RRC configured) with a relationship (e.g., metric) between the expected CLI/SI and the amount/age/latency of the data stored in the uplink buffer such that one side of the relationship includes UE 205 skipping the CG based uplink transmission and UE 205 performing the CG based uplink transmission on the other side of the relationship (e.g., see above chart). As one non-limiting example, this may include UE 205 using the metric to skip the CG based uplink transmission when the interference profile exceeds the negative impacts to the size/age/latency parameter(s) of the data. As another non-limiting example, this may include UE 205 using the metric to perform the CG based uplink transmission when the interference profile fails to exceed the negative impacts to the size/age/latency parameter(s) of the data.

In some aspects, the metric may be RRC signaled according to different techniques. For example, the relationship (e.g., metric) may be communicated via a linear relationship, may use multiple linear constraints, may use non-linear constraints, and/or may be a table listing different threshold levels.

Additionally, or alternatively, aspects of the techniques described herein provide for the network to base the repetition factor for the CG based uplink resources on whether the CG resources are configured in a full-duplex slot or a half-duplex slot, based on a frequency gap between uplink resources and downlink resources, and the like. Additional aspects of the feature are described below with reference to FIG. 4.

Figure 3:
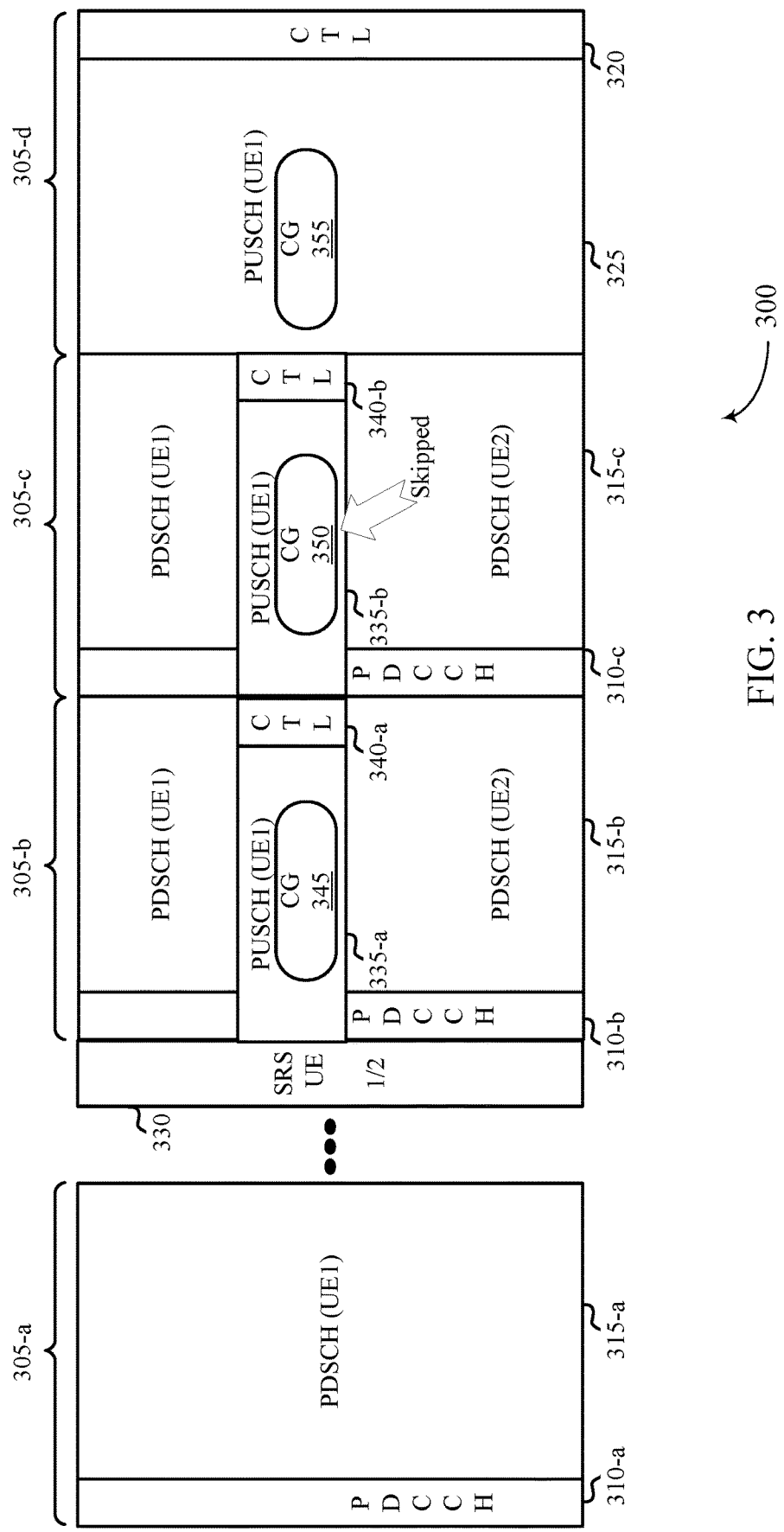
FIG. 3 illustrates an example of a duplexing configuration that supports CG skipping and repetition considerations in full-duplex networks in accordance with one or more aspects of the present disclosure.

FIG. 3 illustrates an example of a duplexing configuration 300 that supports CG skipping and repetition considerations in full-duplex networks in accordance with one or more aspects of the present disclosure. Duplexing configuration 300 may implement aspects of wireless communications systems 100 and/or 200. Aspects of duplexing configuration 300 may be implemented at or implemented by a UE and/or network entity, which may be examples of the corresponding devices described herein.

As discussed above, aspects of the techniques described herein provide for a UE to perform skipping operations for CG based uplink transmissions, even in the situation where the UE has data stored and available for communicating in its uplink buffer in a CG based uplink transmission. For example, the UE may identify or otherwise determine that is has data stored in its uplink buffer. In addition to the uplink data being ready for communicating, the UE may also identify or otherwise determine an interference profile associated with the UE performing the CG based uplink transmission communicating the data stored in the uplink buffer. As discussed above, the interference profile may be based on the CLI and/or SI (e.g., the estimated or otherwise calculated CLI and/or SI parameters) associated with the UE actually performing the CG based uplink transmission. Accordingly, the UE may perform the skipping operations for the CG based uplink transmission based on the interference profile as well as the data stored in the uplink buffer.

Duplexing configuration 300 illustrates one non-limiting example of duplexing operations that may be adopted in accordance with the techniques described herein. For example, a plurality of slots 305 may be available for communications between a UE and a base station. Each slot 305 may generally include a control (CTL) portion 310 (e.g., a PDCCH used for communicating control information, such as DCI communications) and a data portion 315 (e.g., a PDSCH used for communicating data). Slot 305-*a* provides an example of a downlink slot where the control portion 310-*a* comprises a downlink control portion (e.g., PDCCH) and data portion 315-*a* comprises a downlink data portion (e.g., PDSCH). For downlink slots 305, the control portion 310 occurs at the beginning of the slot 305 (e.g., the first two or three symbols) while the data portion 315 uses most or all of the remaining symbols in the slot (there may be one or more gap symbols within the data portion 315). Slot 305-*d* comprises an example of an uplink slot where the control portion 320 occurs in the last two or three symbols of the slot 305 and the data portion 325 occurs in the remaining symbols of the slot 305. Moreover, some slots 305 may include one or more portions 330 where UE (such as a first UE, UE1, and a second UE, UE2) perform SRS transmissions to sound the channel.

However, slot 305-*b* and slot 305-*c* illustrate examples of flexible duplexing (e.g., downlink-plus-uplink) slots. In particular, slot 305-*b* and slot 305-*c* illustrate examples of SBFD slots supporting full-duplex communications using uplink resources (e.g., PUSCH) as well as using downlink resources (e.g., PDSCH). As discussed above, the time resources may overlap in the time domain in the SBFD scenario while the frequency resources used for downlink transmissions are different from the frequency resources used for uplink transmissions.

In the non-limiting example illustrated in FIG. 3, this may include slot 305-*b* including a first portion of downlink frequency resources allocated to downlink transmissions to the first UE (e.g., PDSCH for UE1) and a second portion of downlink frequency resources allocated to downlink transmissions to the second UE (e.g., PDSCH for UE2). Slot 305-*b* may include control portion 310-*b* and data portion 315-*b*. Slot 305-*b* may also include a set of uplink frequency resources, that may optionally include both a data portion 335-*a* (e.g., used for communicating uplink data) and a control portion 340-*a* (e.g., used for communicating scheduling requests (SR) transmissions, buffer status report (BSR) transmissions, uplink control information (UCI) transmissions, and the like). In some examples, the set of uplink frequency resources in slot 305-*b* may include CG based resources, such as CG 345 which may correspond to uplink frequency resources that are configured on a CG basis. In this example, the set of uplink frequency resources may be configured for the first UE to use to perform a CG based uplink transmission.

In the non-limiting example illustrated in FIG. 3, this may also include slot 305-*c* including a first portion of downlink frequency resources allocated to downlink transmissions to the first UE (e.g., PDSCH for UE1) and a second portion of downlink frequency resources allocated to downlink transmissions to the second UE (e.g., PDSCH for UE2). Slot 305-*c* may include a control portion 310-*c* and a data portion 315-*c*. Slot 305-*c* may also include a set of uplink frequency resources, that may optionally include both a data portion 335-*b* and a control portion 340-*b*. In some examples, the set of uplink frequency resources in slot 305-*c* may include CG based resources, such as CG 350 which may correspond to uplink frequency resources that are configured on a CG basis. In this example, the set of uplink frequency resources may be configured for the first UE to use to perform a CG based uplink transmission.

In the non-limiting example illustrated in FIG. 3, the uplink slot (e.g., slot 305-*d*) may also include a portion of the uplink frequency resources being CG based resources. Accordingly, slot 305-*d* may also include CG 355 for the first UE to perform a CG based uplink transmission.

However, as discussed above the UE may perform skipping operations where one or more CG based uplink transmissions are either skipped or performed based on the data stored in the uplink buffer of the UE as well as the interference profile associated with the UE performing the CG based uplink transmission. For example, the UE may perform the CG based uplink transmission during slot 305-*b* using CG 345 when the CLI parameter and/or SI parameter are at or below corresponding CLI and SI thresholds. As another example, the UE may skip the CG based uplink transmission during slot 305-*c* using CG 350 when the CLI parameter and/or SI parameter are above the corresponding CLI and SI thresholds.

Figure 4:
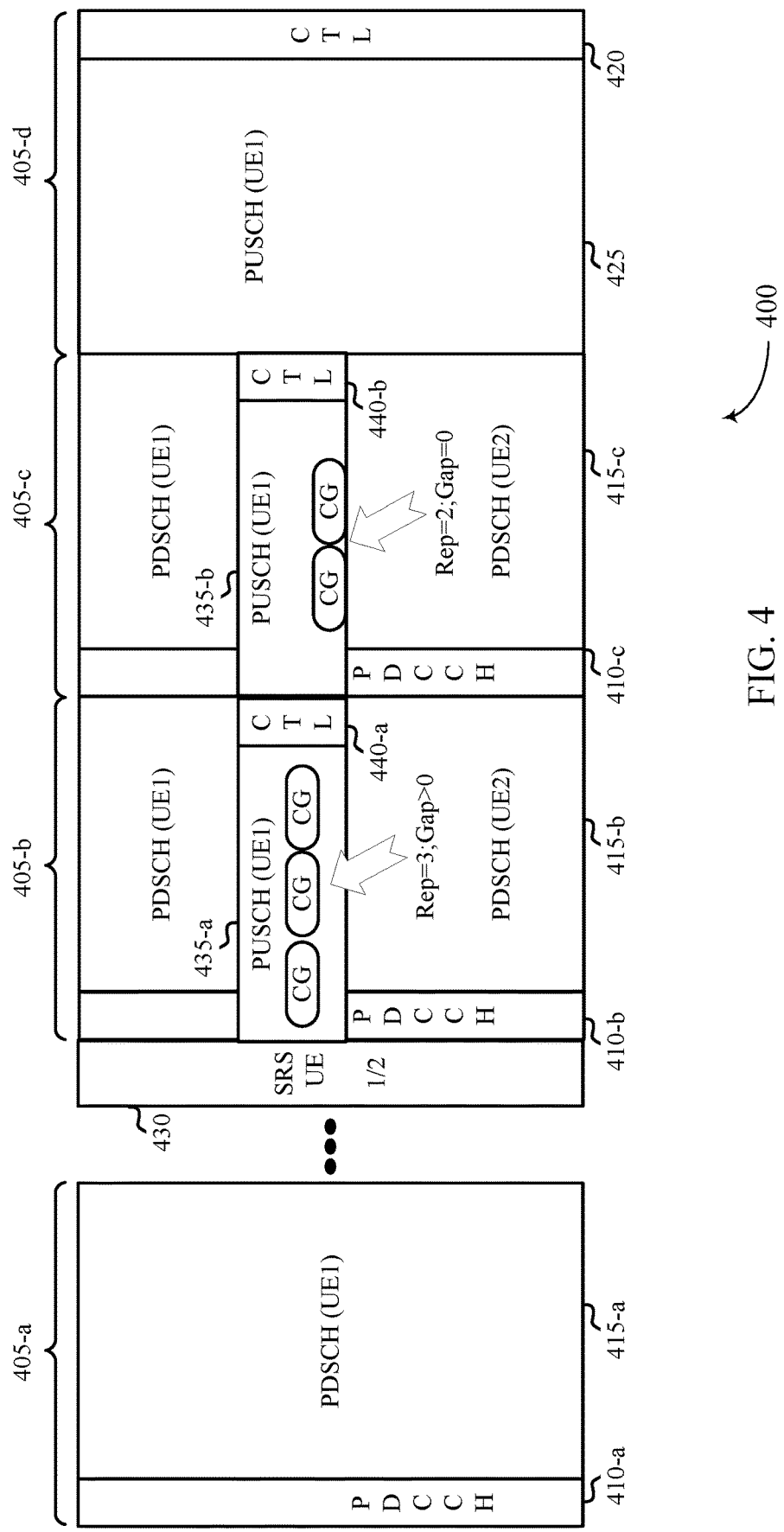
FIG. 4 illustrates an example of a duplexing configuration that supports CG skipping and repetition considerations in full-duplex networks in accordance with one or more aspects of the present disclosure.

FIG. 4 illustrates an example of a duplexing configuration 400 that supports CG skipping and repetition considerations in full-duplex networks in accordance with one or more aspects of the present disclosure. Duplexing configuration 400 may implement aspects of wireless communication systems 100 and/or 200 and/or duplexing configuration 300. Aspects of duplexing configuration 400 may be implemented at or implemented by a UE and/or network entity, which may be examples of the corresponding devices described herein.

As discussed above, aspects of the techniques described herein provide for a UE to perform skipping operations for CG based uplink transmissions, even in the situation where the UE has data stored and available for communicating in its uplink buffer in a CG based uplink transmission. For example, the UE may identify or otherwise determine that is has data stored in its uplink buffer. In addition to the uplink data being ready for communicating, the UE may also identify or otherwise determine an interference profile associated with the UE performing the CG based uplink transmission communicating the data stored in the uplink buffer. As discussed above, the interference profile may be based on the CLI and/or SI (e.g., the estimated or otherwise calculated CLI and/or SI parameters) associated with the UE actually performing the CG based uplink transmission. Accordingly, the UE may perform the skipping operations for the CG based uplink transmission based on the interference profile as well as the data stored in the uplink buffer.

In some examples, this may include a plurality of slots 405 being available for communications between a UE and a base station. Each slot 405 may generally include a control portion 410 (e.g., a PDCCH used for communicating control information, such as DCI communications) and a data portion 415 (e.g., a PDSCH used for communicating data). Slot 405-*a* provides an example of a downlink slot where the control portion 410-*a* comprises a downlink control portion (e.g., PDCCH) and data portion 415-*a* comprises a downlink data portion (e.g., PDSCH). For downlink slots 405, the control portion 410 occurs at the beginning of the slot 405 (e.g., the first two or three symbols) while the data portion 415 uses most or all of the remaining symbols in the slot (there may be one or more gap symbols within the data portion 415). Slot 405-*d* comprises an example of an uplink slot where the control portion 420 occurs in the last two or three symbols of the slot 405-*d* and the data portion 425 occurs in the remaining symbols of the slot 405-*d*. Moreover, some slots 405 may include one or more portions 430 where UE (such as a first UE, UE1, and a second UE, UE2) perform SRS transmissions to sound the channel.

However, slot 405-*b* and slot 405-*c* illustrate examples of flexible duplexing (e.g., downlink-plus-uplink) slots. In particular, slot 405-*b* and slot 405-*c* illustrate examples of SBFD slots supporting full-duplex communications using uplink resources (e.g., PUSCH) as well as using downlink resources (e.g., PDSCH). As discussed above, the time resources may overlap in the time domain in the SBFD scenario while the frequency resources used for downlink transmissions are different from the frequency resources used for uplink transmissions.

In the non-limiting example illustrated in FIG. 4, this may include slot 405-*b* including a first portion of downlink frequency resources allocated to downlink transmissions to the first UE (e.g., PDSCH for UE1) and a second portion of downlink frequency resources allocated to downlink transmissions to the second UE (e.g., PDSCH for UE2). Slot 405-*b* may include a control portion 410-*b* and data portion 415-*b*. Slot 405-*b* may also include a set of uplink frequency resources, that may optionally include both a data portion 435-*a* (e.g., used for communicating uplink data) and a control portion 440-*a* (e.g., used for communicating SR transmissions, BSR transmissions, UCI transmissions, and the like). In some examples, the set of uplink frequency resources in slot 405-*b* may include CG based resources, which may correspond to uplink frequency resources that are configured on a CG basis. In this example, the set of uplink frequency resources may be configured for the first UE to use to perform a CG based uplink transmission.

In the non-limiting example illustrated in FIG. 4, this may also include slot 405-c including a first portion of downlink frequency resources allocated to downlink transmissions to the first UE (e.g., PDSCH for UE1) and a second portion of downlink frequency resources allocated to downlink transmissions to the second UE (e.g., PDSCH for UE2). Slot 405-c may include control portion 410-c and data portion 415-c. Slot 405-c may also include a set of uplink frequency resources, that may optionally include both a data portion 435-b and a control portion 440-b. In some examples, the set of uplink frequency resources in slot 405-c may include CG based resources, which may correspond to uplink frequency resources that are configured on a CG basis. In this example, the set of uplink frequency resources may be configured for the first UE to use to perform a CG based uplink transmission.

As discussed above, the UE may perform skipping operations where one or more CG based uplink transmissions are either skipped or performed based on the data stored in the uplink buffer of the UE as well as the interference profile associated with the UE performing the CG based uplink transmission.

As also discussed above, aspects of the techniques described herein provide for considerations of the repetition factor used for CG based resource configurations. Again, the network entity may generally configure UE with CG configuration(s) that each identify the uplink resources to be used for CG based uplink transmissions as well as the configuration/parameters to use with the CG based resources when performing the CG based uplink transmissions. In some aspects, this may include a repetition factor for the CG based uplink frequency resources configured within a slot 405. That is, the repetition factor indicated in a CG configuration may identify how many time the CG based frequency resources are repeated within the slot 405. The repetition factor generally improves the uplink coverage. Accordingly, in some examples this may include a UE receiving or otherwise obtaining a signal configuring the set of uplink resources available for the UE to use to perform the CG based uplink transmissions. However, slots 405 supporting full-duplex communications may benefit from additional repetition factor considerations to improve the uplink communications generally, and the UE's skipping operations more particular.

A first example may include the network entity selecting the repetition factor for the CG resources within a slot 405 based on whether or not the slot 405 is a full-duplex slot or a half-duplex slot. For example, the UE may identify or otherwise determine (e.g., based on the CG configuration signaling) a metric defining a first repetition factor for uplink resources (e.g., frequency resources) in the set of uplink resources within a full-duplex slot that are different from a second repetition factor for uplink resources (e.g., frequency resources) in the set of uplink resources within a half-duplex slot. Accordingly, in this first example different repetition factors are configured for the full-duplex slots as compared to the half-duplex slots.

A second example may include the network entity selecting the repetition factor based on a frequency gap (e.g., in resource block(s) (RB)(s) and/or in sub-RB(s)) between the uplink frequency resources and the downlink frequency resources within the slot. For example, the UE may identify or otherwise determine (e.g., based on the CG configuration signaling) a metric (e.g., the repetition factor indicated in the CG configuration) defining the repetition factor based on the frequency gap between the uplink frequency resources and downlink frequency resources within the slot. In one example, the metric may define the relationship between the frequency gap as a table defining a fixed relationship between the repetition factor and the frequency gap (e.g., a table between the number of repetitions and the frequency gap is configured). In another example, the metric may additionally or alternatively define the relationship between the frequency gap based on a weighting factor applied to the frequency gap to define the repetition factor (e.g., a defined relationship where the number of repetitions is equal to a floor, such as the number of RBs divided by the weighting factor (e.g., a, where a is the configured metric).

Duplexing configuration 400 illustrates a non-limiting example of this second example where the number of CG repetitions within a slot 405 are based on the frequency gap. Slot 405-b includes three CG repetitions being configured using uplink frequency resources (e.g., CG based frequency resources) that are generally in the middle of the bandwidth of slot 405-d (e.g., frequency gap is greater than 0). Slot 405-d includes two CG repetitions being configured using uplink frequency resources (e.g., CG based frequency resources) that are generally next to the downlink frequency resources configured for downlink transmissions to the second UE (e.g., frequency gap=0). This provides a relatively larger frequency gap between the uplink frequency resources of the CG repetitions and any downlink frequency resources during slot 405-b than in slot 405-c. Accordingly, slot 405-b illustrates an example where more CG repetitions are configured during slot 405-b based on the frequency gap being greater than zero while slot 405-c illustrates an examiner where fewer CG repetitions are configured during slot 405-c based on the frequency gap being zero.

A third option may include the repetition factor being considered based on the calculated transmit power of each CG repetition. For example, the UE may calculate, estimate, identify or otherwise determine (e.g., based on the CG configuration signaling) a metric (e.g., the repetition factor indicated in the CG configuration) defining the repetition factor based on the transmit power of each CG repetition configured within the slot. That is, the network entity may identify or otherwise determine the transmit power that the UE will use for each CG based uplink transmission to be performed using each available CG repetition within the slot. Based on that transmit power, the number CG repetitions configured within a slot may be based on the transmit power.

In some aspects, the skipping operations discussed above may be applied per CG repetition and include a minimum acceptable number of repetitions (e.g., a minimum number of CG repetitions that are skipped before all CG repetitions are skipped within the slot). If the number of skipped CG repetitions is satisfies the threshold, the UE may skip all of the CG repetitions within the slot. In some aspects, the CLI and/or SI parameter(s)/threshold(s) discussed above may be defined on a per-CG repetition basis.

Figure 5:
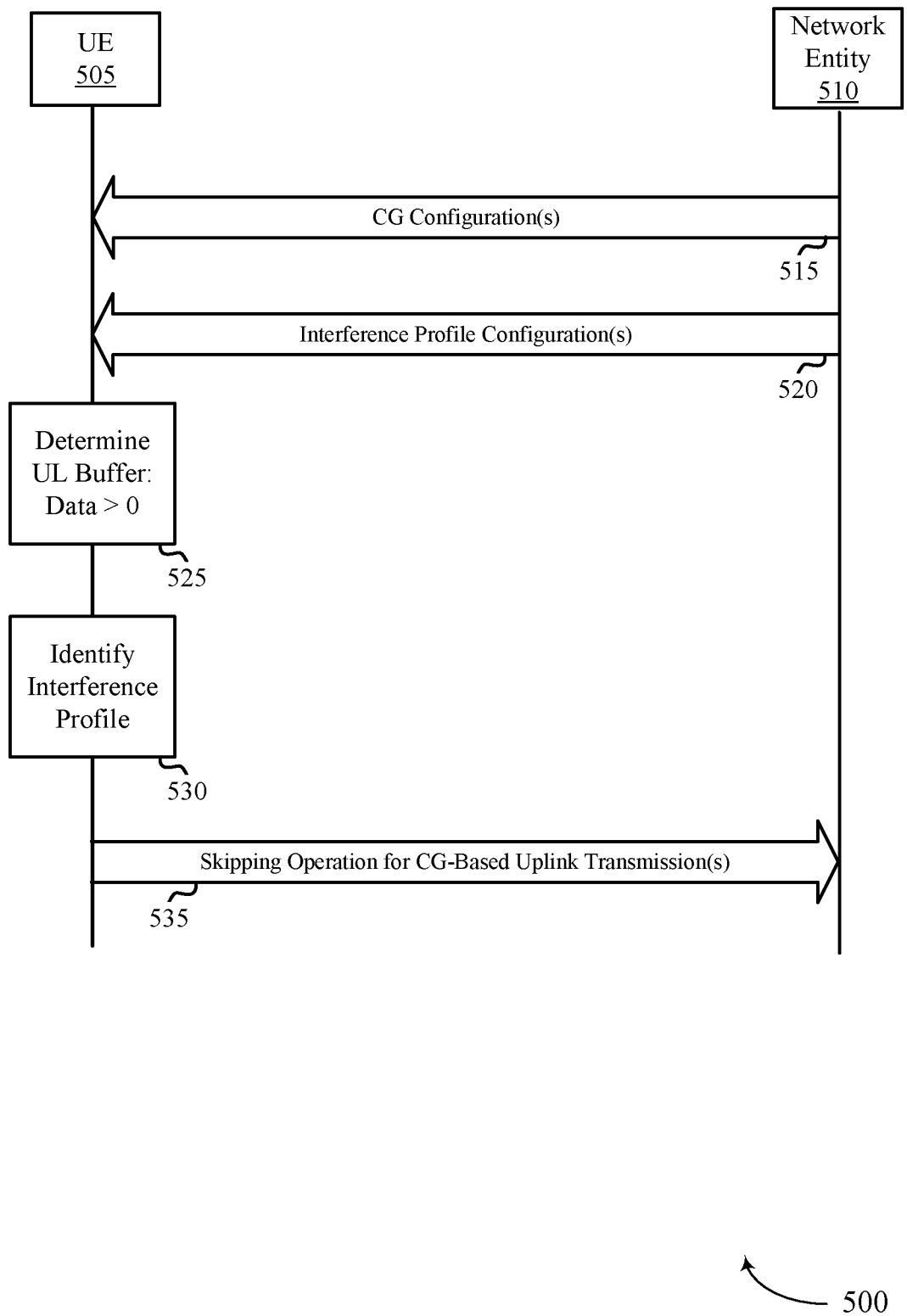
FIG. 5 illustrates an example of a method that supports CG skipping and repetition considerations in full-duplex networks in accordance with one or more aspects of the present disclosure.

FIG. 5 illustrates an example of a method 500 that supports CG skipping and repetition considerations in full-duplex networks in accordance with one or more aspects of the present disclosure. Method 500 may implement aspects of wireless communication systems 100 and/or 200 and/or aspects of duplexing configurations 300 and/or 400. Aspects of method 500 may be implemented at or implemented by UE 505 and/or network entity 510, which may be examples of the corresponding devices described herein.

At 515, network entity 510 may transmit or otherwise provide (and UE 505 may receive or otherwise obtain) configuration signaling. In some examples, the configuration signaling may include one or more signals configuring resources (e.g., a set of resources). The resources may include uplink and/or downlink resources. The resources may include dynamic resources and/or semi-persistent resources (e.g., CG resources). The resources may include time resources, frequency resources, spatial resources, and/or code resources. The resources may be used for communications between UE 505 and network entity 510 (e.g., Uu interface based cellular resources) and/or for communications between UE 505 and adjacent UE (e.g., PC5 interface based sidelink resources). For example, the resources may be used for uplink transmissions from UE 505 to network entity 510 and/or for downlink transmissions from network entity 510 to UE 505. In some examples, the signal configuring the set of uplink resources may include RRC signaling configuring CG configuration(s) including the resources.

At 520, network entity 510 may transmit or otherwise provide (and UE 505 may receive or otherwise obtain) an indication of an interference profile threshold. In some examples, the interference profile threshold may be for communications between UE 505 and network entity 510. In some examples, the interface profile threshold may be for communications between UE 505 and adjacent UE. In some examples, the interference profile threshold may be an interference level associated with communications between UE 505 and network entity 510. In some examples, the interference profile threshold may include a CLI threshold associated with communications between UE 505 and network entity 510. In some examples, the interference profile threshold may include a SI threshold associated with communications between UE 505 and network entity 510. In some examples, the interference profile threshold may define skipping operations based on comparing latency/size/age parameter(s) for data stored in an uplink buffer of UE 505 to an interference profile. In some examples, the interference profile threshold may be communicated in conjunction with the signal configuring the set of uplink resources or via separate signaling.

At 525, UE 505 may identify or otherwise determine an uplink buffer status. In some examples, the uplink buffer status may be for one or more uplink buffers of UE 505. In some examples, the uplink buffers status may be an empty uplink buffer status or non-empty uplink buffer status. In some examples, the empty uplink buffer status may indicate that UE 505 does not have data stored in an uplink buffer to be communicated to network entity 510. In some examples, the non-empty uplink buffer status may indicate that UE 505 has data stored in an uplink buffer to be communicated to network entity 510. In some examples, the data stored in the uplink buffer may be communicated in a CG based uplink transmission.

At 530, UE 505 may identify or otherwise determine an interference profile. In some examples, the interference profile may be associated with UE 505 performing wireless communications. In some examples, the interference profile may be associated with UE 505 performing an uplink transmission. In some examples, the interference profile may be associated with UE 505 performing a CG based uplink transmission.

In some examples, the interference profile may be associated with CLI associated with UE 505 performing wireless communications. In some examples, the interference profile may be associated with SI associated with UE 505 performing wireless communications. In some examples, the wireless communications associated with the interference profile may include full-duplex wireless communications. In some examples, the wireless communications associated with the interference profile may include half-duplex communications. In some examples, the interference profile may be CLI and/or SI associated with UE 505 performing the wireless communication s.

At 535, UE 505 may perform skipping operations. In some examples, the skipping operations may be performed based on an empty uplink buffer status and/or a non-empty uplink buffer status of UE 505. In some examples, the skipping operations may be based on the data stored in the uplink buffer of UE 505. In some examples, the skipping operations may be based on the interference profile. In some examples, the skipping operations may be based on the age parameter of the data stored in the uplink buffer of UE 505. In some examples, the skipping operations may be based on the latency parameter of the data stored in the uplink buffer of UE 505. In some examples, the skipping operations may be based on the size parameter of the data stored in the uplink buffer of UE 505. In some examples, the skipping operations may be performed based on any combination of the data, interference profile, age parameter, latency parameter, and/or size parameter. In some examples, the skipping operations may be based on additional parameters.

In some examples, the skipping operations include UE 505 performing a CG based uplink transmission to network entity 510. In some examples, the skipping operations include UE 505 skipping or otherwise not performing a CG based uplink transmission to network entity 510.

Figure 6:
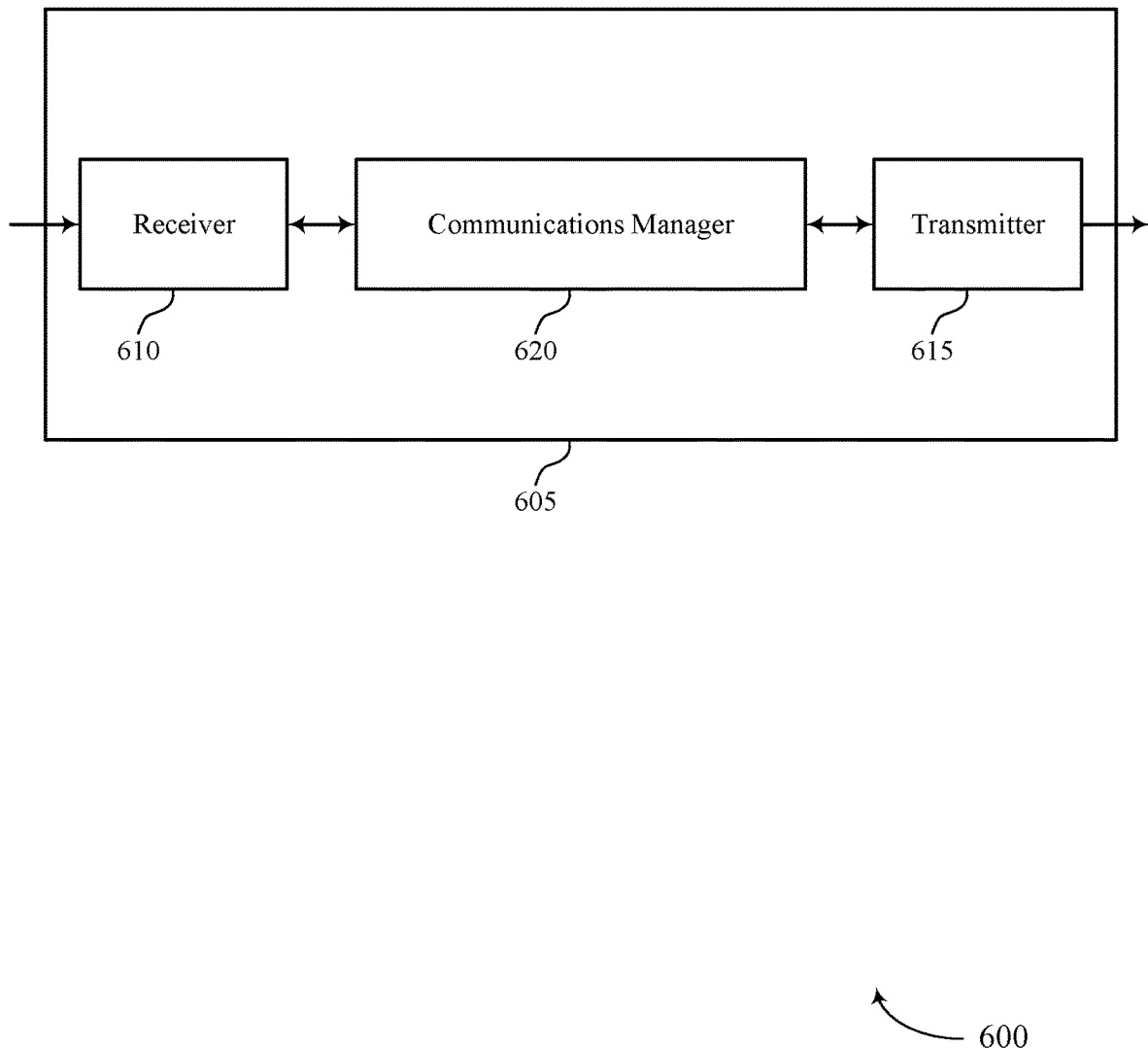
FIGS. 6 and 7 show block diagrams of devices that support CG skipping and repetition considerations in full-duplex networks in accordance with one or more aspects of the present disclosure.

FIG. 6 shows a block diagram 600 of a device 605 that supports CG skipping and repetition considerations in full-duplex networks in accordance with one or more aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to CG skipping and repetition considerations in full-duplex networks). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to CG skipping and repetition considerations in full-duplex networks). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of CG skipping and repetition considerations in full-duplex networks as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at a UE in accordance with examples as disclosed herein. For example, the communications manager 620 may be configured as or otherwise support a means for determining that an uplink buffer includes data to be communicated in a CG based uplink transmission. The communications manager 620 may be configured as or otherwise support a means for identifying an interference profile associated with the UE performing the CG based uplink transmission. The communications manager 620 may be configured as or otherwise support a means for performing a skipping operation for the CG based uplink transmission based on the data in the uplink buffer and the interference profile, where the skipping operation includes either performing the CG based uplink transmission or skipping the CG based uplink transmission.

By including or configuring the communications manager 620 in accordance with examples as described herein, the device 605 (e.g., a processor controlling or otherwise coupled with the receiver 610, the transmitter 615, the communications manager 620, or any combination thereof) may support techniques for UE-based skipping operations considering an interference profile of a CG based uplink transmission when the UE has data stored in its uplink buffer.

Figure 7:
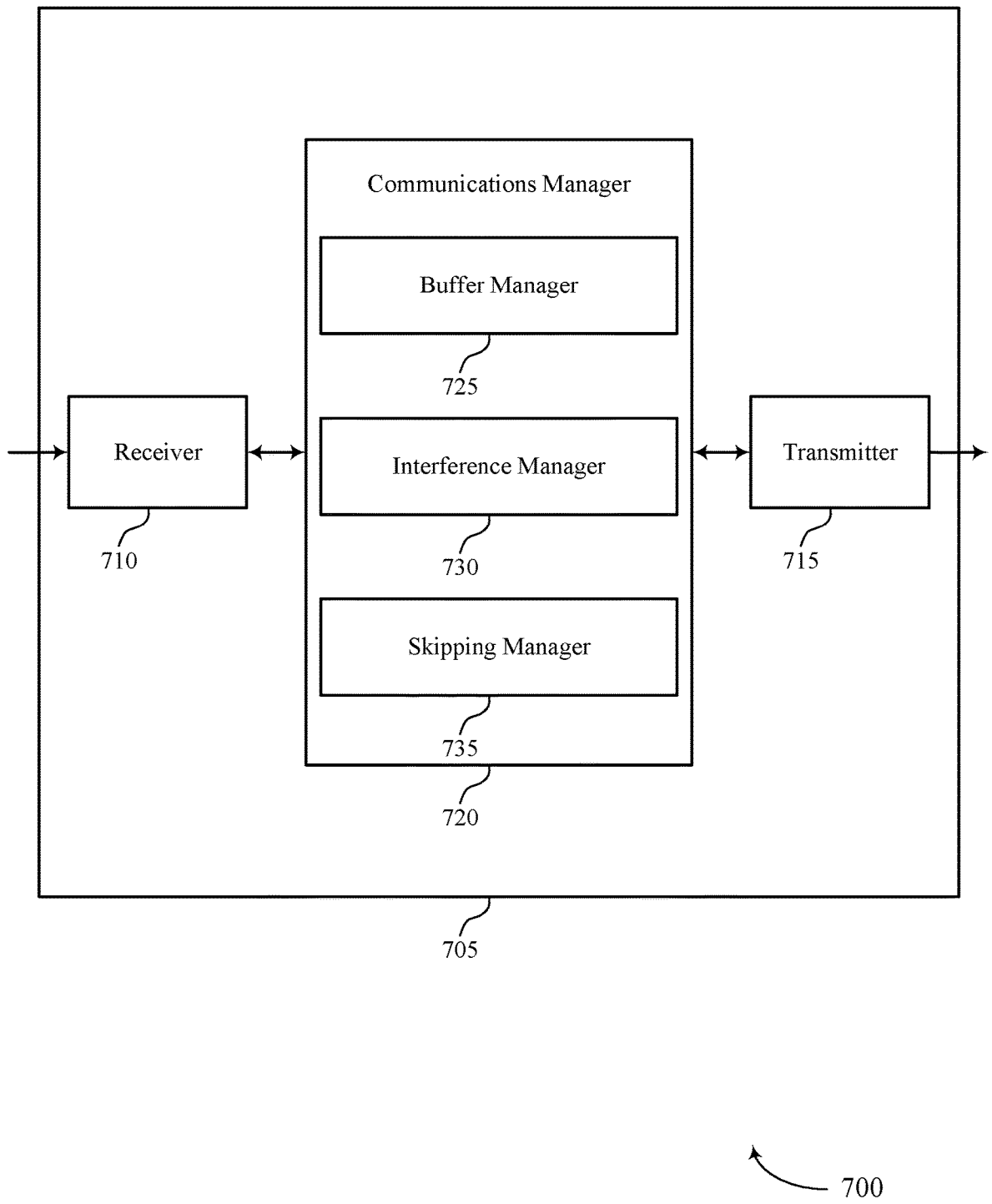

FIG. 7 shows a block diagram 700 of a device 705 that supports CG skipping and repetition considerations in full-duplex networks in accordance with one or more aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to CG skipping and repetition considerations in full-duplex networks). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to CG skipping and repetition considerations in full-duplex networks). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of CG skipping and repetition considerations in full-duplex networks as described herein. For example, the communications manager 720 may include a buffer manager 725, an interference manager 730, a skipping manager 735, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communication at a UE in accordance with examples as disclosed herein. The buffer manager 725 may be configured as or otherwise support a means for determining that an uplink buffer includes data to be communicated in a CG based uplink transmission. The interference manager 730 may be configured as or otherwise support a means for identifying an interference profile associated with the UE performing the CG based uplink transmission. The skipping manager 735 may be configured as or otherwise support a means for performing a skipping operation for the CG based uplink transmission based on the data in the uplink buffer and the interference profile, where the skipping operation includes either performing the CG based uplink transmission or skipping the CG based uplink transmission.

Figure 8:
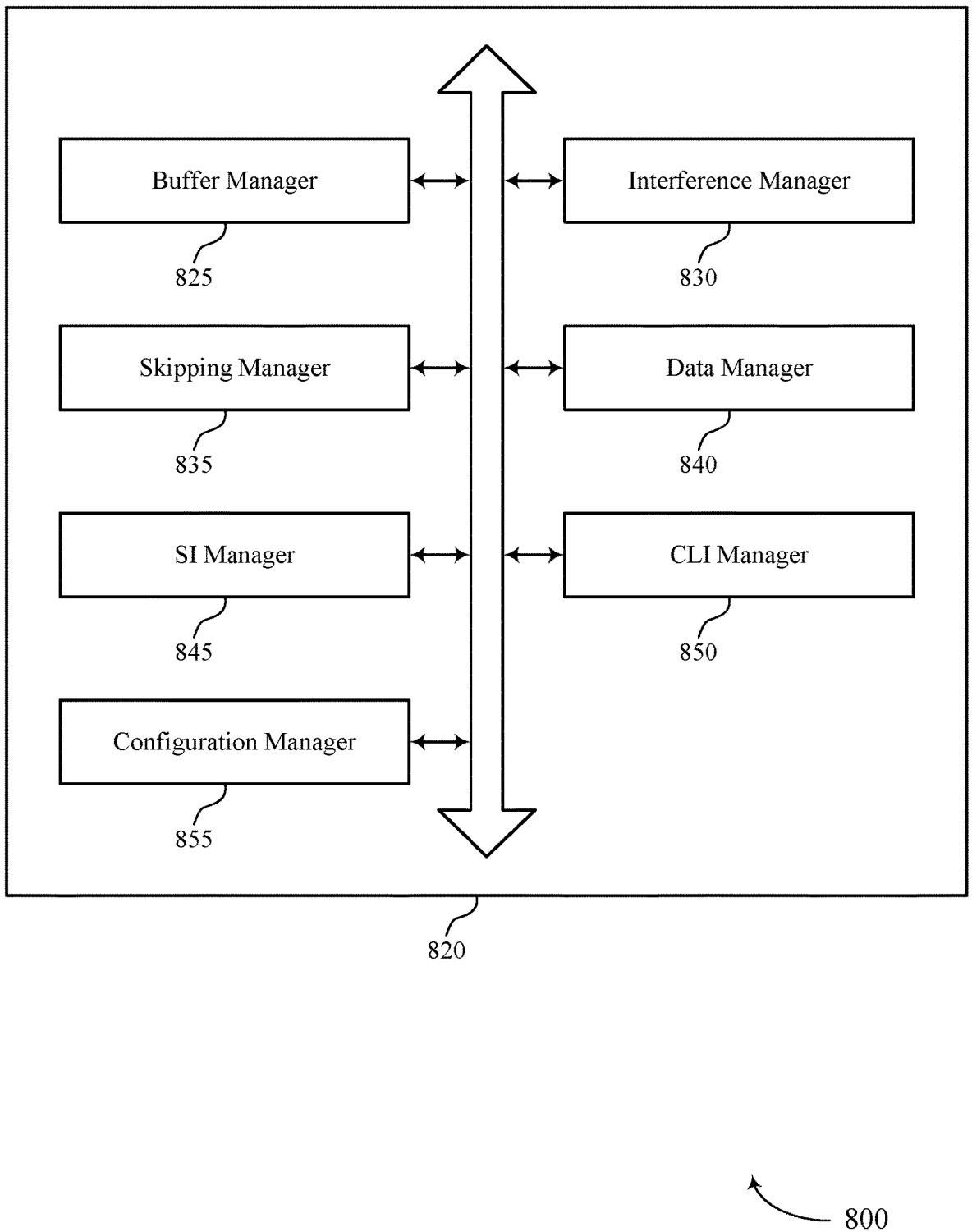
FIG. 8 shows a block diagram of a communications manager that supports CG skipping and repetition considerations in full-duplex networks in accordance with one or more aspects of the present disclosure.

FIG. 8 shows a block diagram 800 of a communications manager 820 that supports CG skipping and repetition considerations in full-duplex networks in accordance with one or more aspects of the present disclosure. The communications manager 820 may be an example of aspects of a communications manager 620, a communications manager 720, or both, as described herein. The communications manager 820, or various components thereof, may be an example of means for performing various aspects of CG skipping and repetition considerations in full-duplex networks as described herein. For example, the communications manager 820 may include a buffer manager 825, an interference manager 830, a skipping manager 835, a data manager 840, an SI manager 845, a CLI manager 850, a configuration manager 855, or any combination thereof. Each of these components may communicate, directly or indirectly, with one another (e.g., via one or more buses).

The communications manager 820 may support wireless communication at a UE in accordance with examples as disclosed herein. The buffer manager 825 may be configured as or otherwise support a means for determining that an uplink buffer includes data to be communicated in a CG based uplink transmission. The interference manager 830 may be configured as or otherwise support a means for identifying an interference profile associated with the UE performing the CG based uplink transmission. The skipping manager 835 may be configured as or otherwise support a means for performing a skipping operation for the CG based uplink transmission based on the data in the uplink buffer and the interference profile, where the skipping operation includes either performing the CG based uplink transmission or skipping the CG based uplink transmission.

In some examples, the data manager 840 may be configured as or otherwise support a means for identifying a latency parameter, a size parameter, or both, for the data, where the skipping operation is further based on the latency parameter, the size parameter, or both, for the data. In some examples, the data manager 840 may be configured as or otherwise support a means for receiving an indication of a metric to use when performing the skipping operation, where the metric defines the skipping operation as comparing the latency parameter, the size parameter, or both, to the interference profile associated with the UE performing the CG based uplink transmission.

In some examples, to support identifying the interference profile, the SI manager 845 may be configured as or otherwise support a means for identifying a SI parameter associated with the UE performing the CG based uplink transmission, where the interference profile is based on the SI parameter. In some examples, the SI manager 845 may be configured as or otherwise support a means for receiving an indication of a SI threshold for the CG based uplink transmission. In some examples, the SI manager 845 may be configured as or otherwise support a means for comparing the SI parameter to the SI threshold, where the skipping operation is based on a result of the comparing. In some examples, the skipping operation includes performing the CG based uplink transmission when the SI parameter is below the SI threshold and skipping the CG based uplink transmission when the SI parameter is at or above the SI threshold. In some examples, the SI manager 845 may be configured as or otherwise support a means for identifying the SI parameter based on the UE operating in a full-duplex communication mode concurrently with performing the CG based uplink transmission.

In some examples, to support identifying the interference profile, the CLI manager 850 may be configured as or otherwise support a means for identifying a CLI parameter associated with the UE performing the CG based uplink transmission at a transmit power level, where the interference profile is based on the CLI parameter.

In some examples, the CLI manager 850 may be configured as or otherwise support a means for receiving an indication of a CLI threshold for the configured-grant based uplink transmission. In some examples, the CLI manager 850 may be configured as or otherwise support a means for comparing the CLI parameter for the CG based uplink transmission to the CLI threshold, where the skipping operation is based on a result of the comparing. In some examples, the skipping operation includes performing the CG based uplink transmission when the CLI parameter for the CG based uplink transmission at the transmit power level is below the CLI threshold and skipping the CG based uplink transmission at the transmit power level when the CLI parameter is at or above the CLI threshold. In some examples, the CLI parameter is based on a CLI level introduced by the UE performing the CG based uplink transmission at the transmit power level and the CLI threshold defines a maximum transmit power level corresponding to a maximum CLI level.

In some examples, the CLI manager 850 may be configured as or otherwise support a means for identifying the CLI parameter based on one or more neighboring devices operating in a full-duplex communication mode concurrently with the UE performing the CG based uplink transmission.

In some examples, the configuration manager 855 may be configured as or otherwise support a means for receiving a signal configuring a set of uplink resources available for the UE to perform CG based uplink transmissions. In some examples, the configuration manager 855 may be configured as or otherwise support a means for identifying, based on the signal, a metric defining first repetition factor for uplink resources in the set of uplink resources within a full-duplex slot that is different from a second repetition factor for uplink resources in the set of uplink resources within a half-duplex slot. In some examples, the configuration manager 855 may be configured as or otherwise support a means for identifying, based on the signal, a metric defining a repetition factor for the set of uplink resources based on a frequency gap between uplink resources for the CG based uplink transmission and downlink resources within a slot.

In some examples, the metric includes at least one of a table defining a fixed relation between the repetition factor and the frequency gap, a weighting factor applied to the frequency gap to define the repetition factor, or both. In some examples, the configuration manager 855 may be configured as or otherwise support a means for identifying, based on the signal, a metric defining a transmit power level of each CG based uplink transmission repetition, where a repetition factor is based on the transmit power level of each CG based uplink transmission.

Figure 9:
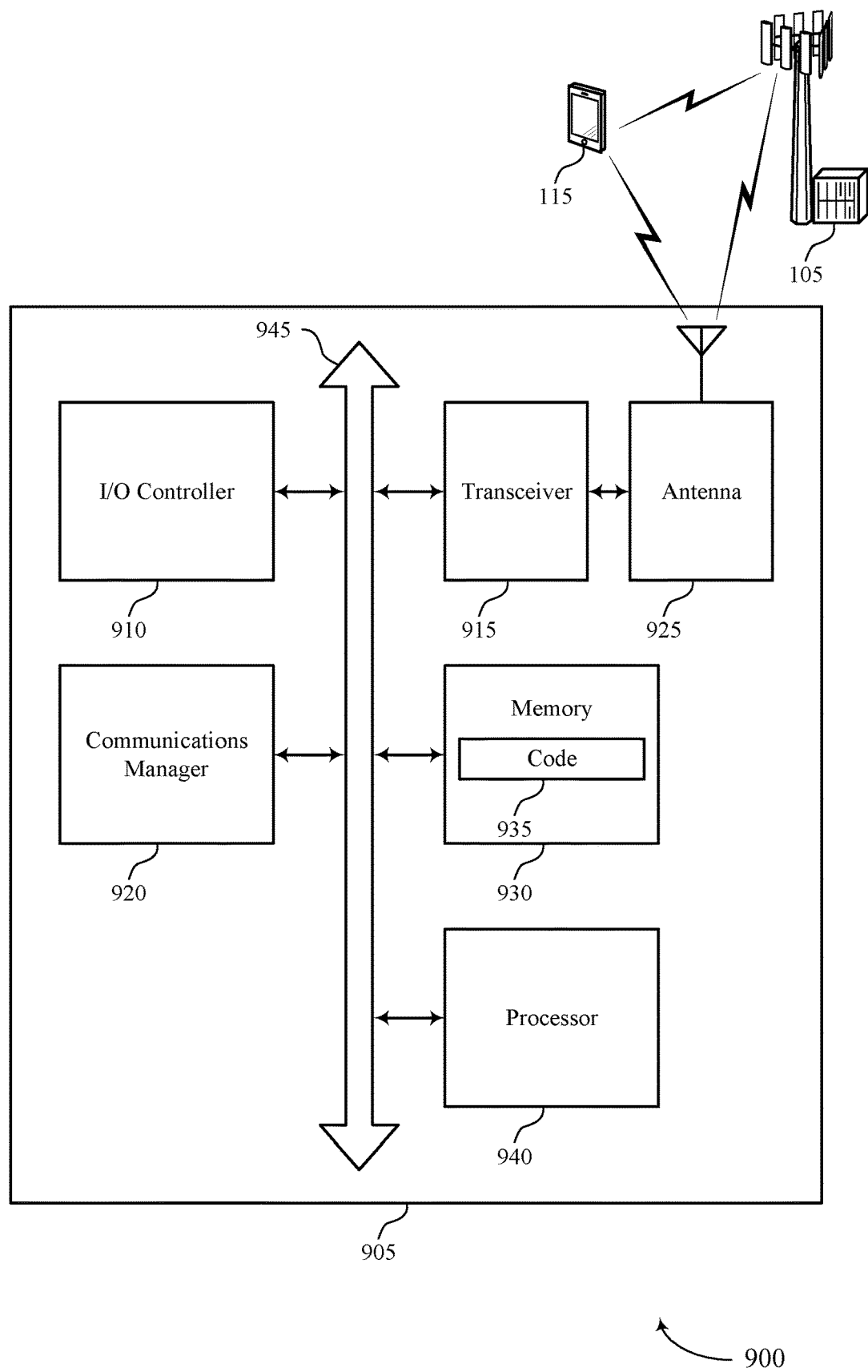
FIG. 9 shows a diagram of a system including a device that supports CG skipping and repetition considerations in full-duplex networks in accordance with one or more aspects of the present disclosure.

FIG. 9 shows a diagram of a system 900 including a device 905 that supports CG skipping and repetition considerations in full-duplex networks in accordance with one or more aspects of the present disclosure. The device 905 may be an example of or include the components of a device 605, a device 705, or a UE 115 as described herein. The device 905 may communicate (e.g., wirelessly) with one or more network entities 105, one or more UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting CG skipping and repetition considerations in full-duplex networks). For example, the device 905 or a component of the device 905 may include a processor 940 and memory 930 coupled with or to the processor 940, the processor 940 and memory 930 configured to perform various functions described herein.

The communications manager 920 may support wireless communication at a UE in accordance with examples as disclosed herein. For example, the communications manager 920 may be configured as or otherwise support a means for determining that an uplink buffer includes data to be communicated in a CG based uplink transmission. The communications manager 920 may be configured as or otherwise support a means for identifying an interference profile associated with the UE performing the CG based uplink transmission. The communications manager 920 may be configured as or otherwise support a means for performing a skipping operation for the CG based uplink transmission based on the data in the uplink buffer and the interference profile, where the skipping operation includes either performing the CG based uplink transmission or skipping the CG based uplink transmission.

By including or configuring the communications manager 920 in accordance with examples as described herein, the device 905 may support techniques for UE-based skipping operations considering an interference profile of a CG based uplink transmission when the UE has data stored in its uplink buffer.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of CG skipping and repetition considerations in full-duplex networks as described herein, or the processor 940 and the memory 930 may be otherwise configured to perform or support such operations.

Figure 10:
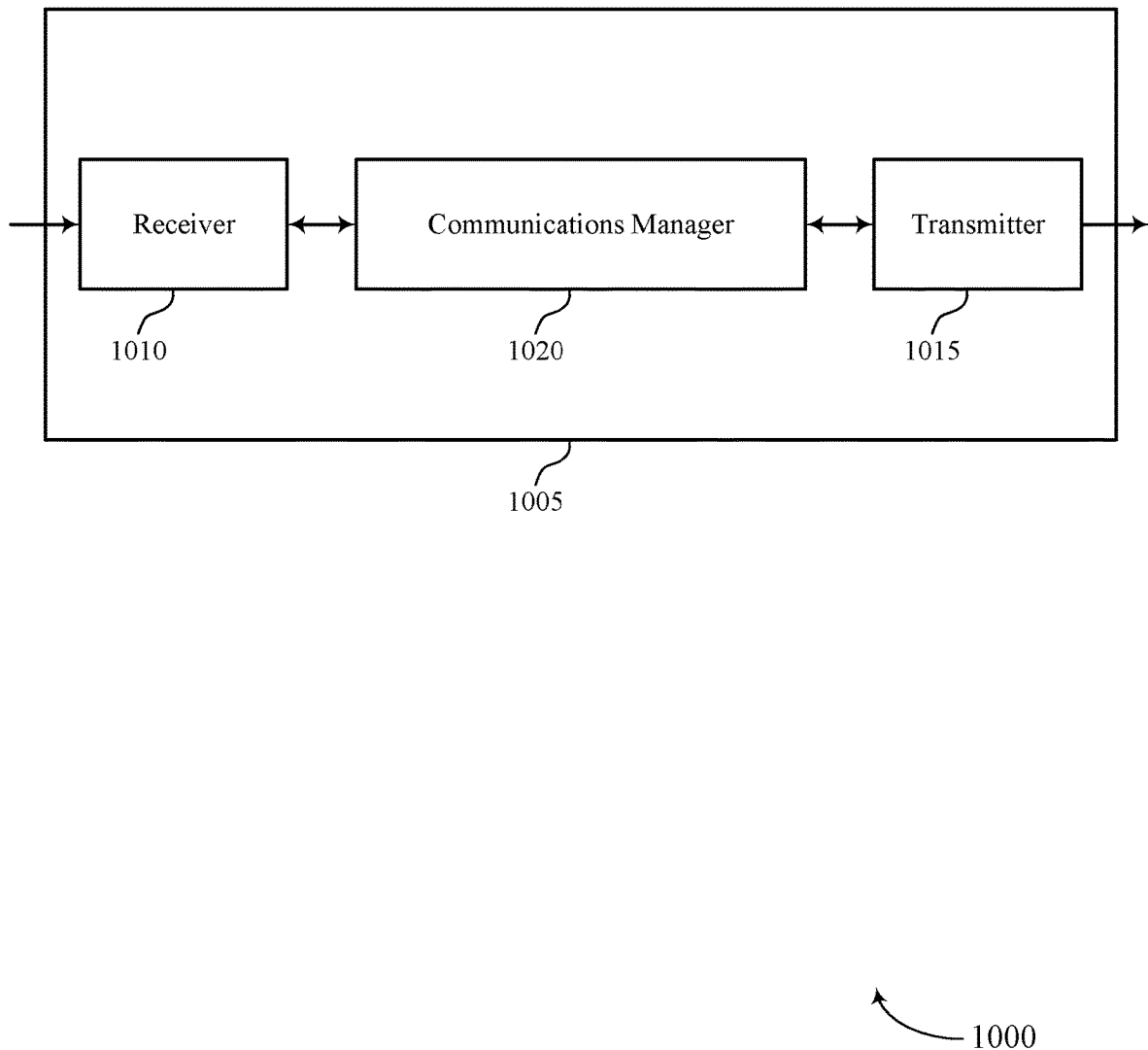
FIGS. 10 and 11 show block diagrams of devices that support CG skipping and repetition considerations in full-duplex networks in accordance with one or more aspects of the present disclosure.

FIG. 10 shows a block diagram 1000 of a device 1005 that supports CG skipping and repetition considerations in full-duplex networks in accordance with one or more aspects of the present disclosure. The device 1005 may be an example of aspects of a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The communications manager 1020, the receiver 1010, the transmitter 1015, or various combinations thereof or various components thereof may be examples of means for performing various aspects of CG skipping and repetition considerations in full-duplex networks as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication at a network entity in accordance with examples as disclosed herein. For example, the communications manager 1020 may be configured as or otherwise support a means for transmitting, to a UE, a signal configuring a set of uplink resources available for the UE to use to perform CG based uplink transmissions. The communications manager 1020 may be configured as or otherwise support a means for transmitting an indication of an interference profile threshold for the UE to use when performing skipping operations on the CG based uplink transmissions. The communications manager 1020 may be configured as or otherwise support a means for receiving one or more CG based uplink transmissions on the set of uplink resources according to the skipping operations applied by the UE, where the skipping operations include the UE either performing at least a portion of the CG based uplink transmissions or skipping the at least the portion of the CG based uplink transmissions.

By including or configuring the communications manager 1020 in accordance with examples as described herein, the device 1005 (e.g., a processor controlling or otherwise coupled with the receiver 1010, the transmitter 1015, the communications manager 1020, or any combination thereof) may support techniques for UE-based skipping operations considering an interference profile of a CG based uplink transmission when the UE has data stored in its uplink buffer.

Figure 11:
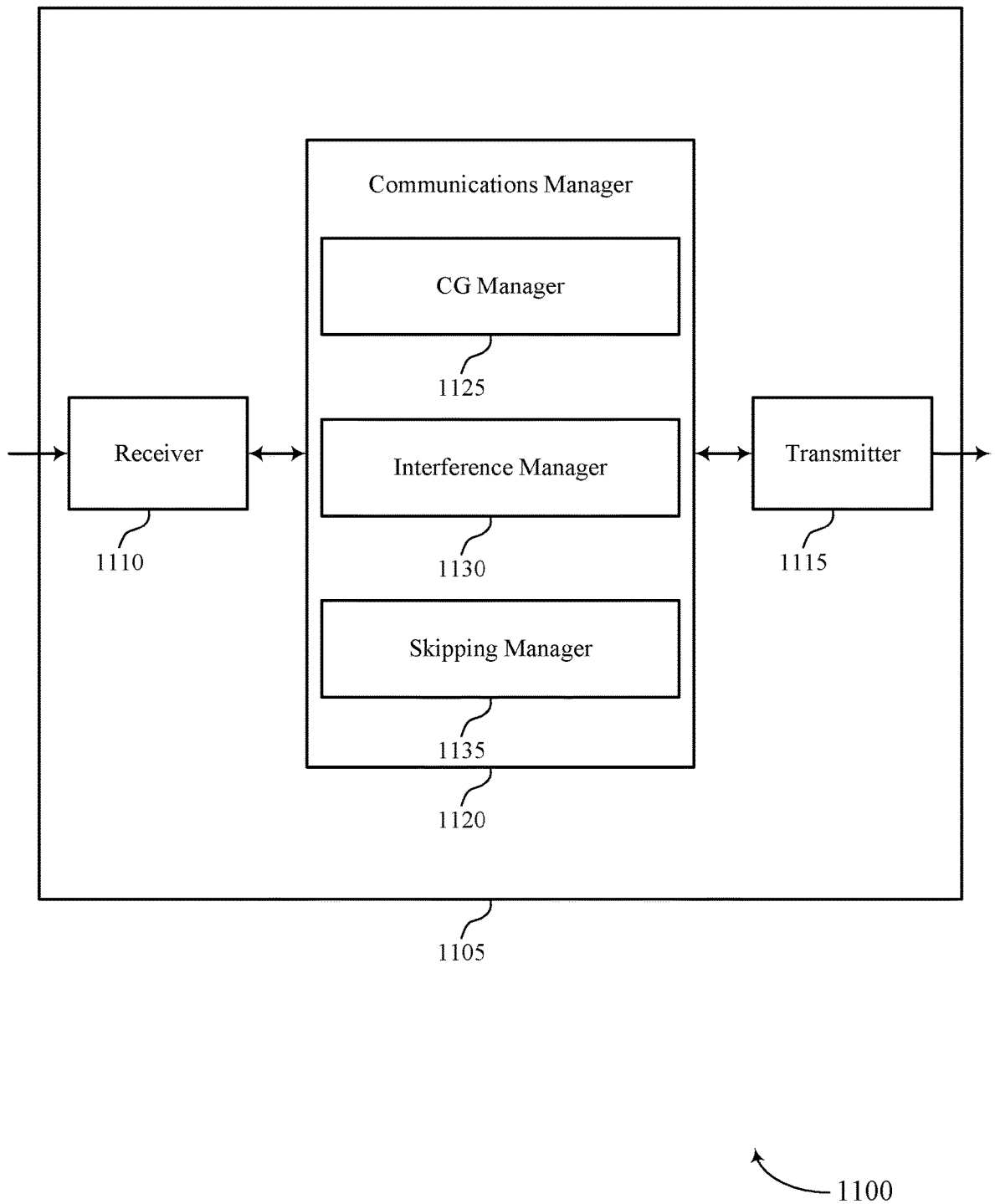

FIG. 11 shows a block diagram 1100 of a device 1105 that supports CG skipping and repetition considerations in full-duplex networks in accordance with one or more aspects of the present disclosure. The device 1105 may be an example of aspects of a device 1005 or a network entity 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The device 1105, or various components thereof, may be an example of means for performing various aspects of CG skipping and repetition considerations in full-duplex networks as described herein. For example, the communications manager 1120 may include a CG manager 1125, an interference manager 1130, a skipping manager 1135, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communication at a network entity in accordance with examples as disclosed herein. The CG manager 1125 may be configured as or otherwise support a means for transmitting, to a UE, a signal configuring a set of uplink resources available for the UE to use to perform CG based uplink transmissions. The interference manager 1130 may be configured as or otherwise support a means for transmitting an indication of an interference profile threshold for the UE to use when performing skipping operations on the CG based uplink transmissions. The skipping manager 1135 may be configured as or otherwise support a means for receiving one or more CG based uplink transmissions on the set of uplink resources according to the skipping operations applied by the UE, where the skipping operations include the UE either performing at least a portion of the CG based uplink transmissions or skipping the at least the portion of the CG based uplink transmissions.

Figure 12:
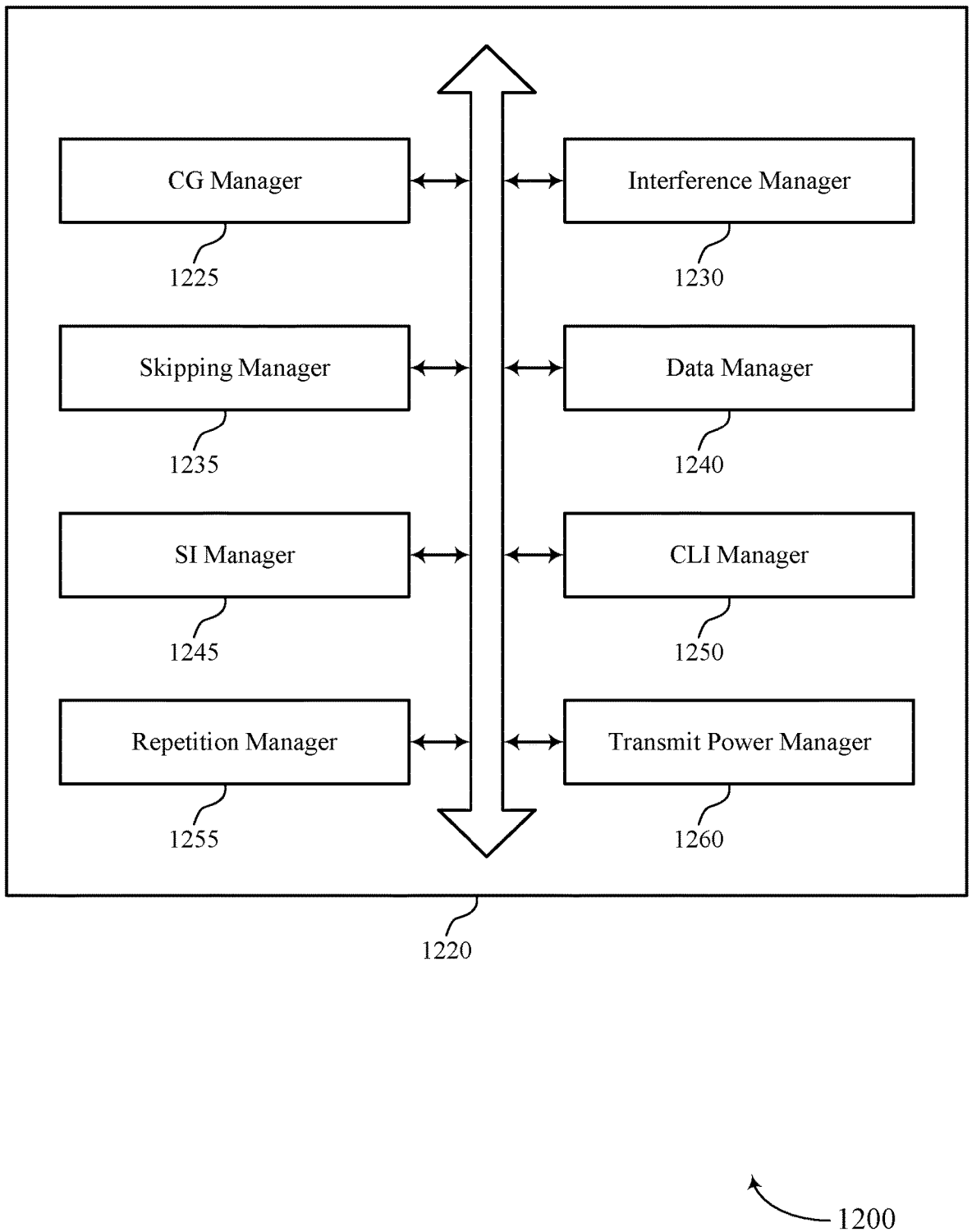
FIG. 12 shows a block diagram of a communications manager that supports CG skipping and repetition considerations in full-duplex networks in accordance with one or more aspects of the present disclosure.

FIG. 12 shows a block diagram 1200 of a communications manager 1220 that supports CG skipping and repetition considerations in full-duplex networks in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of CG skipping and repetition considerations in full-duplex networks as described herein. For example, the communications manager 1220 may include a CG manager 1225, an interference manager 1230, a skipping manager 1235, a data manager 1240, an SI manager 1245, a CLI manager 1250, a repetition manager 1255, a transmit power manager 1260, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1220 may support wireless communication at a network entity in accordance with examples as disclosed herein. The CG manager 1225 may be configured as or otherwise support a means for transmitting, to a UE, a signal configuring a set of uplink resources available for the UE to use to perform CG based uplink transmissions. The interference manager 1230 may be configured as or otherwise support a means for transmitting an indication of an interference profile threshold for the UE to use when performing skipping operations on the CG based uplink transmissions. The skipping manager 1235 may be configured as or otherwise support a means for receiving one or more CG based uplink transmissions on the set of uplink resources according to the skipping operations applied by the UE, where the skipping operations include the UE either performing at least a portion of the CG based uplink transmissions or skipping the at least the portion of the CG based uplink transmissions.

In some examples, to support transmitting the indication of the interference profile threshold, the data manager 1240 may be configured as or otherwise support a means for transmitting an indication of a metric that defines the skipping operations as the UE comparing a latency parameter, a size parameter, or both, for data in an uplink buffer of the UE to an interference profile associated with the UE performing a CG based uplink transmission.

In some examples, to support transmitting the indication of the interference profile threshold, the SI manager 1245 may be configured as or otherwise support a means for transmitting an indication of a SI threshold for a CG based uplink transmission from the UE, where the skipping operations is based on the SI threshold.

In some examples, to support transmitting the indication of the interference profile threshold, the CLI manager 1250 may be configured as or otherwise support a means for transmitting an indication of a CLI threshold for a CG based uplink transmission from the UE, where the skipping operations is based on the CLI threshold.

In some examples, to support transmitting the signal configuring the set of uplink resources, the repetition manager 1255 may be configured as or otherwise support a means for transmitting a metric defining first repetition factor for uplink resources in the set of uplink resources within a full-duplex slot that is different from a second repetition factor for uplink resources in the set of uplink resources within a half-duplex slot. In some examples, to support transmitting the signal configuring the set of uplink resources, the repetition manager 1255 may be configured as or otherwise support a means for transmitting a metric defining a repetition factor for the set of uplink resources based on a frequency gap between uplink resources for the CG based uplink transmissions and downlink resources within a slot. In some examples, the metric includes at least one of a table defining a fixed relation between the repetition factor and the frequency gap, a weighting factor applied to the frequency gap to define the repetition factor, or both.

In some examples, to support transmitting the signal configuring the set of uplink resources, the transmit power manager 1260 may be configured as or otherwise support a means for transmitting a metric defining a transmit power level of each CG based uplink transmission repetition, where a repetition factor is based on the transmit power level of each CG based uplink transmission.

Figure 13:
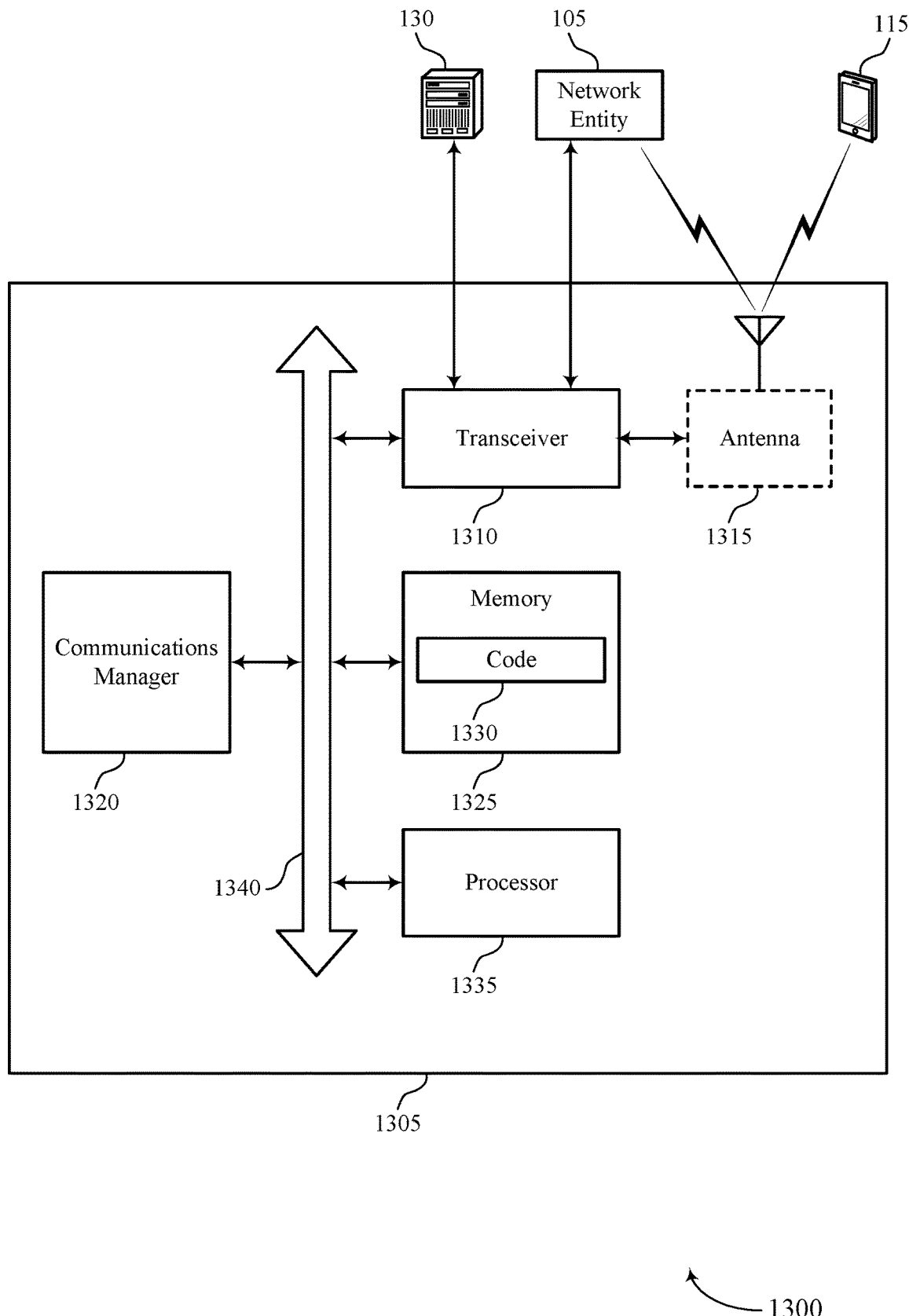
FIG. 13 shows a diagram of a system including a device that supports CG skipping and repetition considerations in full-duplex networks in accordance with one or more aspects of the present disclosure.

FIG. 13 shows a diagram of a system 1300 including a device 1305 that supports CG skipping and repetition considerations in full-duplex networks in accordance with one or more aspects of the present disclosure. The device 1305 may be an example of or include the components of a device 1005, a device 1105, or a network entity 105 as described herein. The device 1305 may communicate with one or more network entities 105, one or more UEs 115, or any combination thereof, which may include communications over one or more wired interfaces, over one or more wireless interfaces, or any combination thereof. The device 1305 may include components that support outputting and obtaining communications, such as a communications manager 1320, a transceiver 1310, an antenna 1315, a memory 1325, code 1330, and a processor 1335. These components may be in electronic communication or otherwise coupled (e.g., operatively, communicatively, functionally, electronically, electrically) via one or more buses (e.g., a bus 1340).

The transceiver 1310 may support bi-directional communications via wired links, wireless links, or both as described herein. In some examples, the transceiver 1310 may include a wired transceiver and may communicate bi-directionally with another wired transceiver. Additionally, or alternatively, in some examples, the transceiver 1310 may include a wireless transceiver and may communicate bi-directionally with another wireless transceiver. In some examples, the device 1305 may include one or more antennas 1315, which may be capable of transmitting or receiving wireless transmissions (e.g., concurrently). The transceiver 1310 may also include a modem to modulate signals, to provide the modulated signals for transmission (e.g., by one or more antennas 1315, by a wired transmitter), to receive modulated signals (e.g., from one or more antennas 1315, from a wired receiver), and to demodulate signals. The transceiver 1310, or the transceiver 1310 and one or more antennas 1315 or wired interfaces, where applicable, may be an example of a transmitter 1015, a transmitter 1115, a receiver 1010, a receiver 1110, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1325 may include RAM and ROM. The memory 1325 may store computer-readable, computer-executable code 1330 including instructions that, when executed by the processor 1335, cause the device 1305 to perform various functions described herein. The code 1330 may be stored in a non-transitory computer-readable medium such as system memory or another type of memory. In some cases, the code 1330 may not be directly executable by the processor 1335 but may cause a computer (e.g., when compiled and executed) to perform functions described herein. In some cases, the memory 1325 may contain, among other things, a BIOS which may control basic hardware or software operation such as the interaction with peripheral components or devices.

The processor 1335 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1335 may be configured to operate a memory array using a memory controller. In some other cases, a memory controller may be integrated into the processor 1335. The processor 1335 may be configured to execute computer-readable instructions stored in a memory (e.g., the memory 1325) to cause the device 1305 to perform various functions (e.g., functions or tasks supporting CG skipping and repetition considerations in full-duplex networks). For example, the device 1305 or a component of the device 1305 may include a processor 1335 and memory 1325 coupled with the processor 1335, the processor 1335 and memory 1325 configured to perform various functions described herein. The processor 1335 may be an example of a cloud-computing platform (e.g., one or more physical nodes and supporting software such as operating systems, virtual machines, or container instances) that may host the functions (e.g., by executing code 1330) to perform the functions of the device 1305.

In some examples, a bus 1340 may support communications of (e.g., within) a protocol layer of a protocol stack. In some examples, a bus 1340 may support communications associated with a logical channel of a protocol stack (e.g., between protocol layers of a protocol stack), which may include communications performed within a component of the device 1305, or between different components of the device 1305 that may be co-located or located in different locations (e.g., where the device 1305 may refer to a system in which one or more of the communications manager 1320, the transceiver 1310, the memory 1325, the code 1330, and the processor 1335 may be located in one of the different components or divided between different components).

In some examples, the communications manager 1320 may manage aspects of communications with a core network 130 (e.g., via one or more wired or wireless backhaul links). For example, the communications manager 1320 may manage the transfer of data communications for client devices, such as one or more UEs 115. In some examples, the communications manager 1320 may manage communications with other network entities 105, and may include a controller or scheduler for controlling communications with UEs 115 in cooperation with other network entities 105. In some examples, the communications manager 1320 may support an X2 interface within an LTE/LTE-A wireless communications network technology to provide communication between network entities 105.

The communications manager 1320 may support wireless communication at a network entity in accordance with examples as disclosed herein. For example, the communications manager 1320 may be configured as or otherwise support a means for transmitting, to a UE, a signal configuring a set of uplink resources available for the UE to use to perform CG based uplink transmissions. The communications manager 1320 may be configured as or otherwise support a means for transmitting an indication of an interference profile threshold for the UE to use when performing skipping operations on the CG based uplink transmissions. The communications manager 1320 may be configured as or otherwise support a means for receiving one or more CG based uplink transmissions on the set of uplink resources according to the skipping operations applied by the UE, where the skipping operations include the UE either performing at least a portion of the CG based uplink transmissions or skipping the at least the portion of the CG based uplink transmissions.

By including or configuring the communications manager 1320 in accordance with examples as described herein, the device 1305 may support techniques for UE-based skipping operations considering an interference profile of a CG based uplink transmission when the UE has data stored in its uplink buffer.

In some examples, the communications manager 1320 may be configured to perform various operations (e.g., receiving, obtaining, monitoring, outputting, transmitting) using or otherwise in cooperation with the transceiver 1310, the one or more antennas 1315 (e.g., where applicable), or any combination thereof. Although the communications manager 1320 is illustrated as a separate component, in some examples, one or more functions described with reference to the communications manager 1320 may be supported by or performed by the processor 1335, the memory 1325, the code 1330, the transceiver 1310, or any combination thereof. For example, the code 1330 may include instructions executable by the processor 1335 to cause the device 1305 to perform various aspects of CG skipping and repetition considerations in full-duplex networks as described herein, or the processor 1335 and the memory 1325 may be otherwise configured to perform or support such operations.

Figure 14:
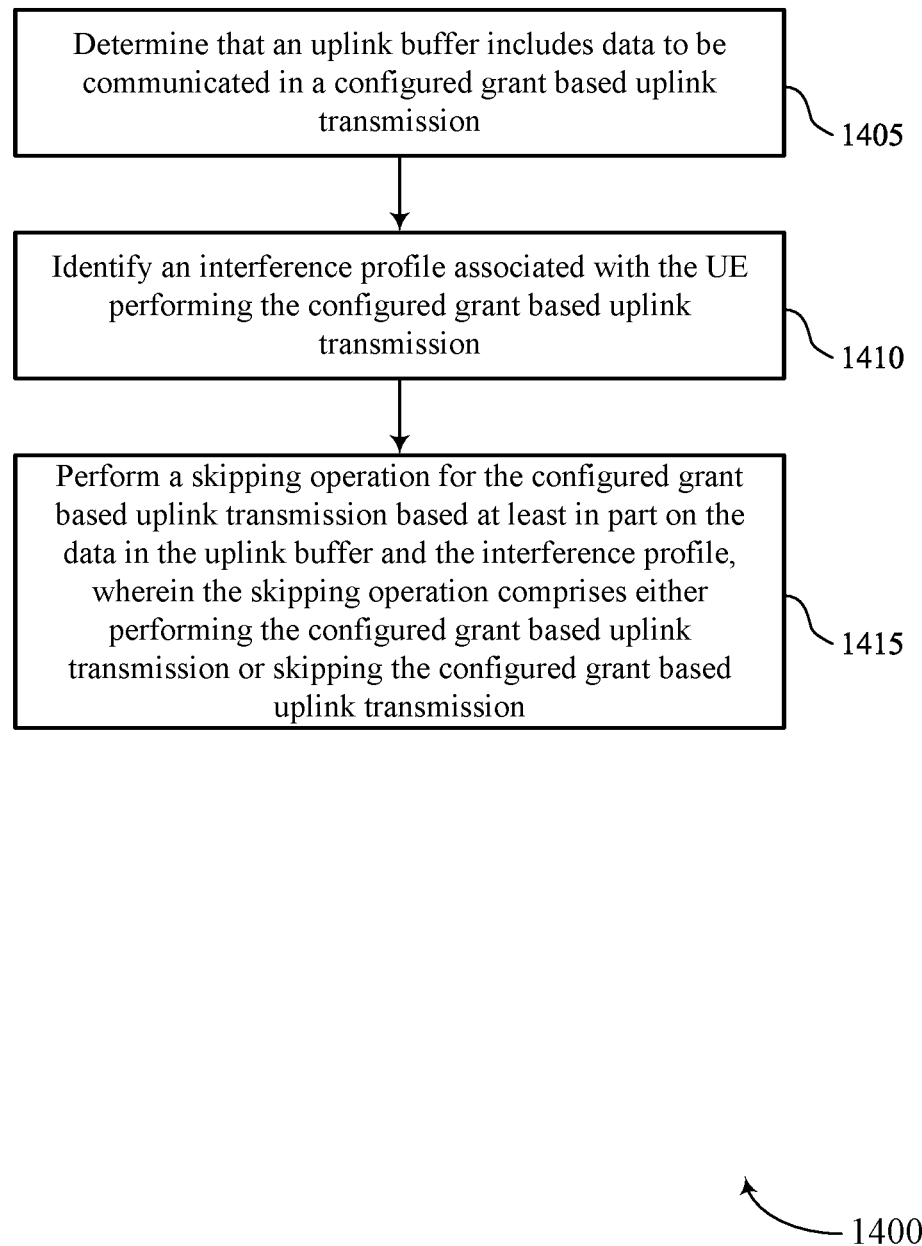
FIGS. 14 through 18 show flowcharts illustrating methods that support CG skipping and repetition considerations in full-duplex networks in accordance with one or more aspects of the present disclosure.

FIG. 14 shows a flowchart illustrating a method 1400 that supports CG skipping and repetition considerations in full-duplex networks in accordance with one or more aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1405, the method may include determining that an uplink buffer includes data to be communicated in a CG based uplink transmission. The operations of 1405 may be performed in accordance with examples as disclosed herein. In some examples, aspects of the operations of 1405 may be performed by a buffer manager 825 as described with reference to FIG. 8.

At 1410, the method may include identifying an interference profile associated with the UE performing the CG based uplink transmission. The operations of 1410 may be performed in accordance with examples as disclosed herein. In some examples, aspects of the operations of 1410 may be performed by an interference manager 830 as described with reference to FIG. 8.

At 1415, the method may include performing a skipping operation for the CG based uplink transmission based on the data in the uplink buffer and the interference profile, where the skipping operation includes either performing the CG based uplink transmission or skipping the CG based uplink transmission. The operations of 1415 may be performed in accordance with examples as disclosed herein. In some examples, aspects of the operations of 1415 may be performed by a skipping manager 835 as described with reference to FIG. 8.

Figure 15:
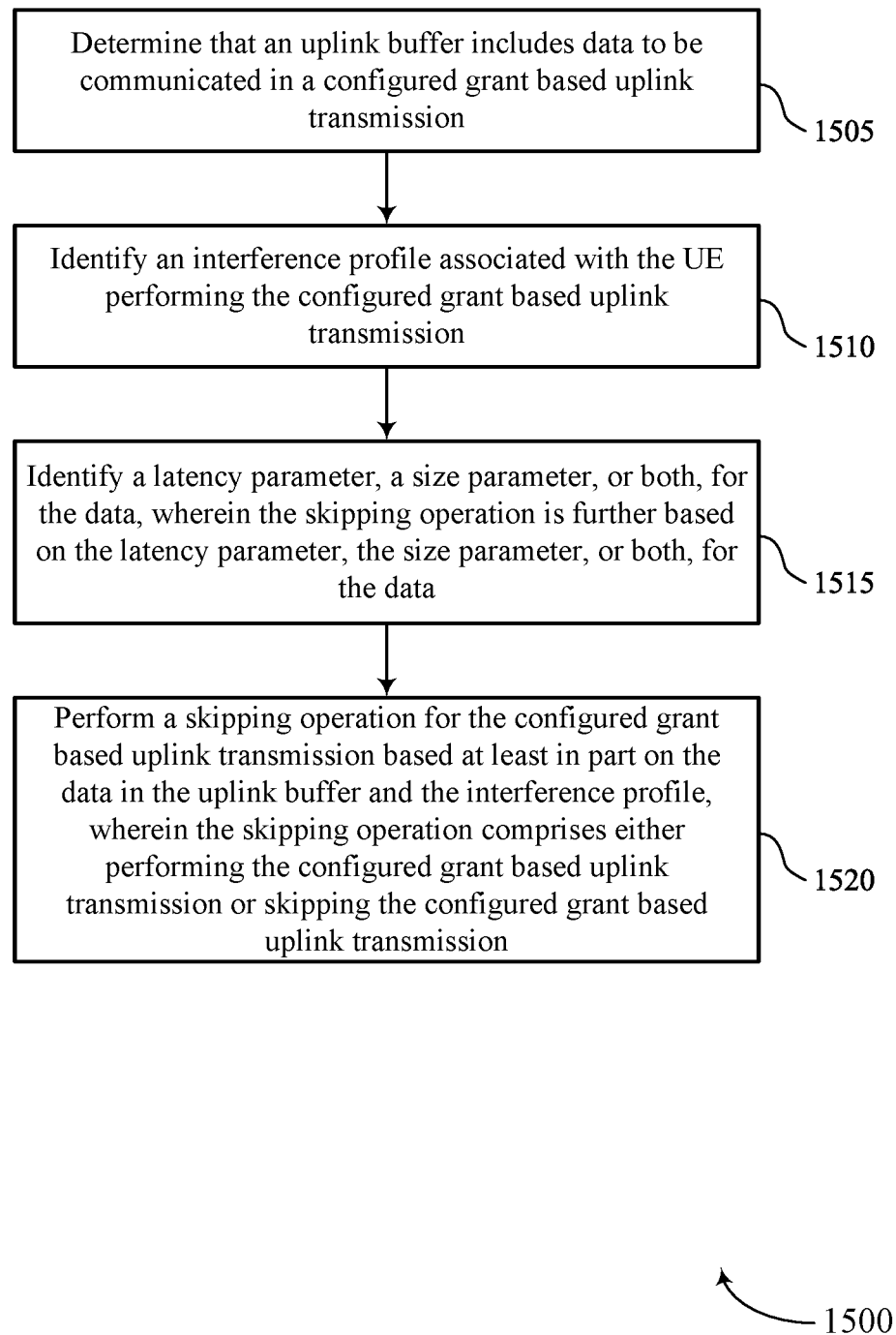

FIG. 15 shows a flowchart illustrating a method 1500 that supports CG skipping and repetition considerations in full-duplex networks in accordance with one or more aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1505, the method may include determining that an uplink buffer includes data to be communicated in a CG based uplink transmission. The operations of 1505 may be performed in accordance with examples as disclosed herein. In some examples, aspects of the operations of 1505 may be performed by a buffer manager 825 as described with reference to FIG. 8.

At 1510, the method may include identifying an interference profile associated with the UE performing the CG based uplink transmission. The operations of 1510 may be performed in accordance with examples as disclosed herein. In some examples, aspects of the operations of 1510 may be performed by an interference manager 830 as described with reference to FIG. 8.

At 1515, the method may include identifying a latency parameter, a size parameter, or both, for the data, where the skipping operation is further based on the latency parameter, the size parameter, or both, for the data. The operations of 1515 may be performed in accordance with examples as disclosed herein. In some examples, aspects of the operations of 1515 may be performed by a data manager 840 as described with reference to FIG. 8.

At 1520, the method may include performing a skipping operation for the CG based uplink transmission based on the data in the uplink buffer and the interference profile, where the skipping operation includes either performing the CG based uplink transmission or skipping the CG based uplink transmission. The operations of 1520 may be performed in accordance with examples as disclosed herein. In some examples, aspects of the operations of 1520 may be performed by a skipping manager 835 as described with reference to FIG. 8.

Figure 16:
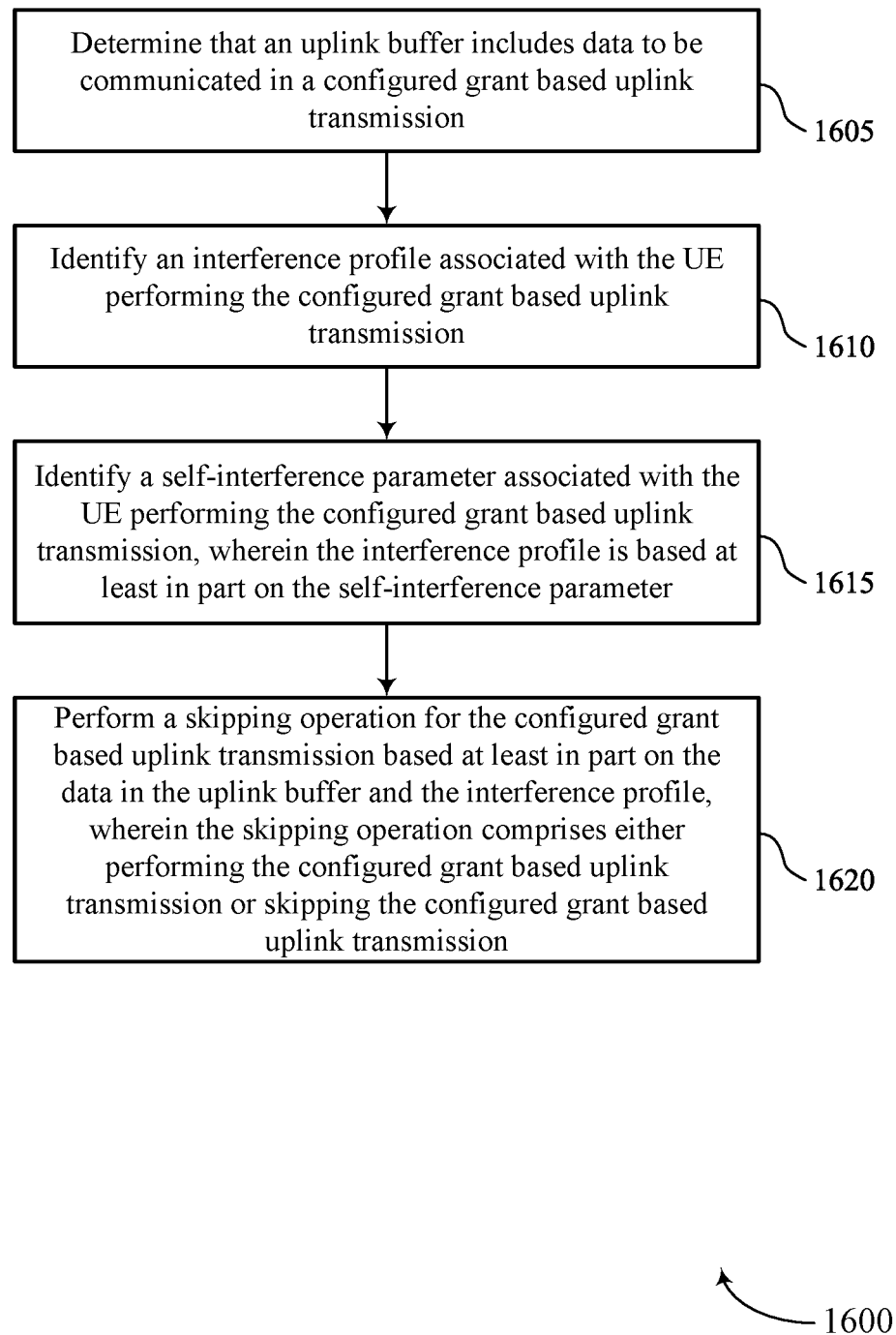

FIG. 16 shows a flowchart illustrating a method 1600 that supports CG skipping and repetition considerations in full-duplex networks in accordance with one or more aspects of the present disclosure. The operations of the method 1600 may be implemented by a UE or its components as described herein. For example, the operations of the method 1600 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1605, the method may include determining that an uplink buffer includes data to be communicated in a CG based uplink transmission. The operations of 1605 may be performed in accordance with examples as disclosed herein. In some examples, aspects of the operations of 1605 may be performed by a buffer manager 825 as described with reference to FIG. 8.

At 1610, the method may include identifying an interference profile associated with the UE performing the CG based uplink transmission. The operations of 1610 may be performed in accordance with examples as disclosed herein. In some examples, aspects of the operations of 1610 may be performed by an interference manager 830 as described with reference to FIG. 8.

At 1615, the method may include identifying a SI parameter associated with the UE performing the CG based uplink transmission, where the interference profile is based on the SI parameter. The operations of 1615 may be performed in accordance with examples as disclosed herein. In some examples, aspects of the operations of 1615 may be performed by an SI manager 845 as described with reference to FIG. 8.

At 1620, the method may include performing a skipping operation for the CG based uplink transmission based on the data in the uplink buffer and the interference profile, where the skipping operation includes either performing the CG based uplink transmission or skipping the CG based uplink transmission. The operations of 1620 may be performed in accordance with examples as disclosed herein. In some examples, aspects of the operations of 1620 may be performed by a skipping manager 835 as described with reference to FIG. 8.

Figure 17:
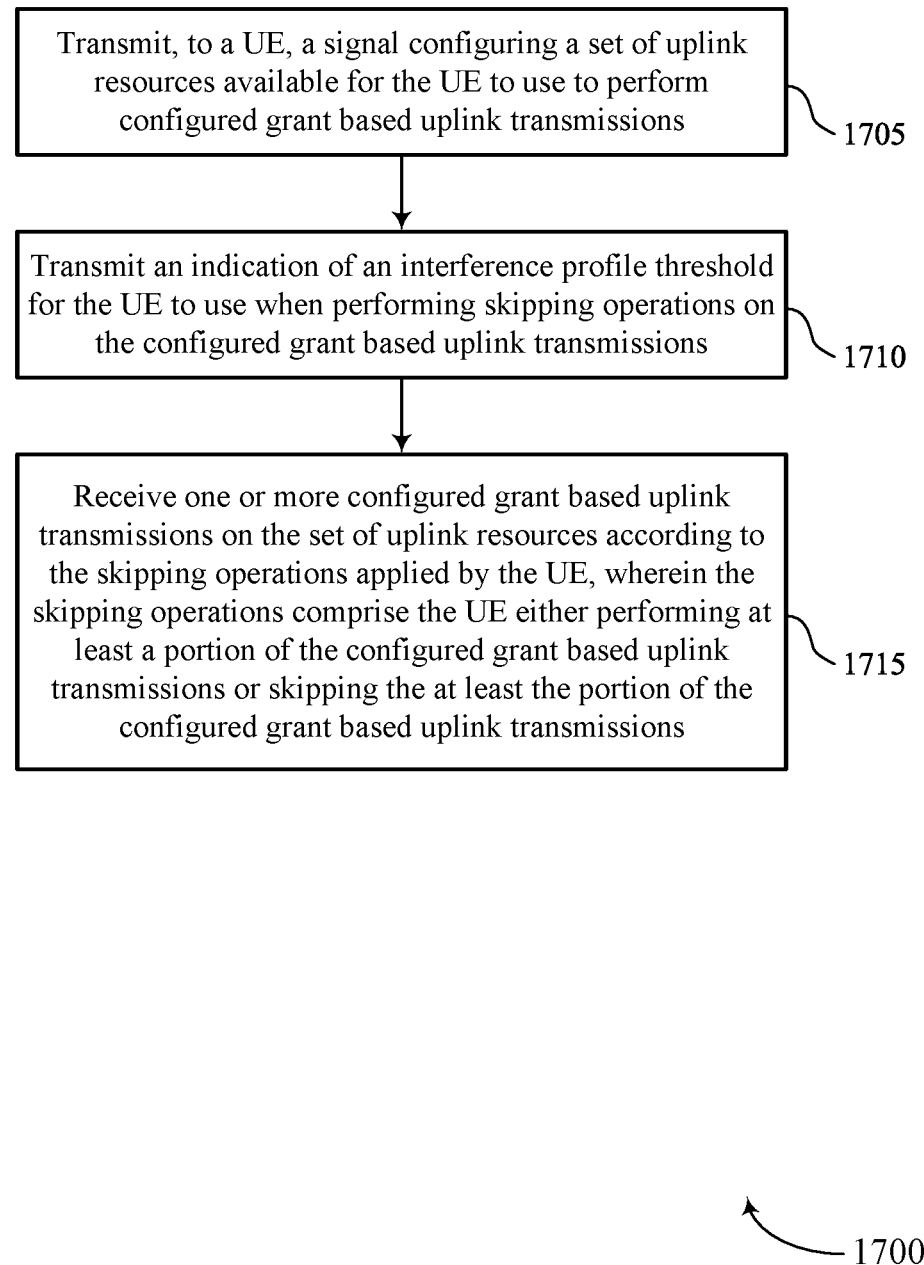

FIG. 17 shows a flowchart illustrating a method 1700 that supports CG skipping and repetition considerations in full-duplex networks in accordance with one or more aspects of the present disclosure. The operations of the method 1700 may be implemented by a network entity or its components as described herein. For example, the operations of the method 1700 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1705, the method may include transmitting, to a UE, a signal configuring a set of uplink resources available for the UE to use to perform CG based uplink transmissions. The operations of 1705 may be performed in accordance with examples as disclosed herein. In some examples, aspects of the operations of 1705 may be performed by a CG manager 1225 as described with reference to FIG. 12.

At 1710, the method may include transmitting an indication of an interference profile threshold for the UE to use when performing skipping operations on the CG based uplink transmissions. The operations of 1710 may be performed in accordance with examples as disclosed herein. In some examples, aspects of the operations of 1710 may be performed by an interference manager 1230 as described with reference to FIG. 12.

At 1715, the method may include receiving one or more CG based uplink transmissions on the set of uplink resources according to the skipping operations applied by the UE, where the skipping operations include the UE either performing at least a portion of the CG based uplink transmissions or skipping the at least the portion of the CG based uplink transmissions. The operations of 1715 may be performed in accordance with examples as disclosed herein. In some examples, aspects of the operations of 1715 may be performed by a skipping manager 1235 as described with reference to FIG. 12.

Figure 18:
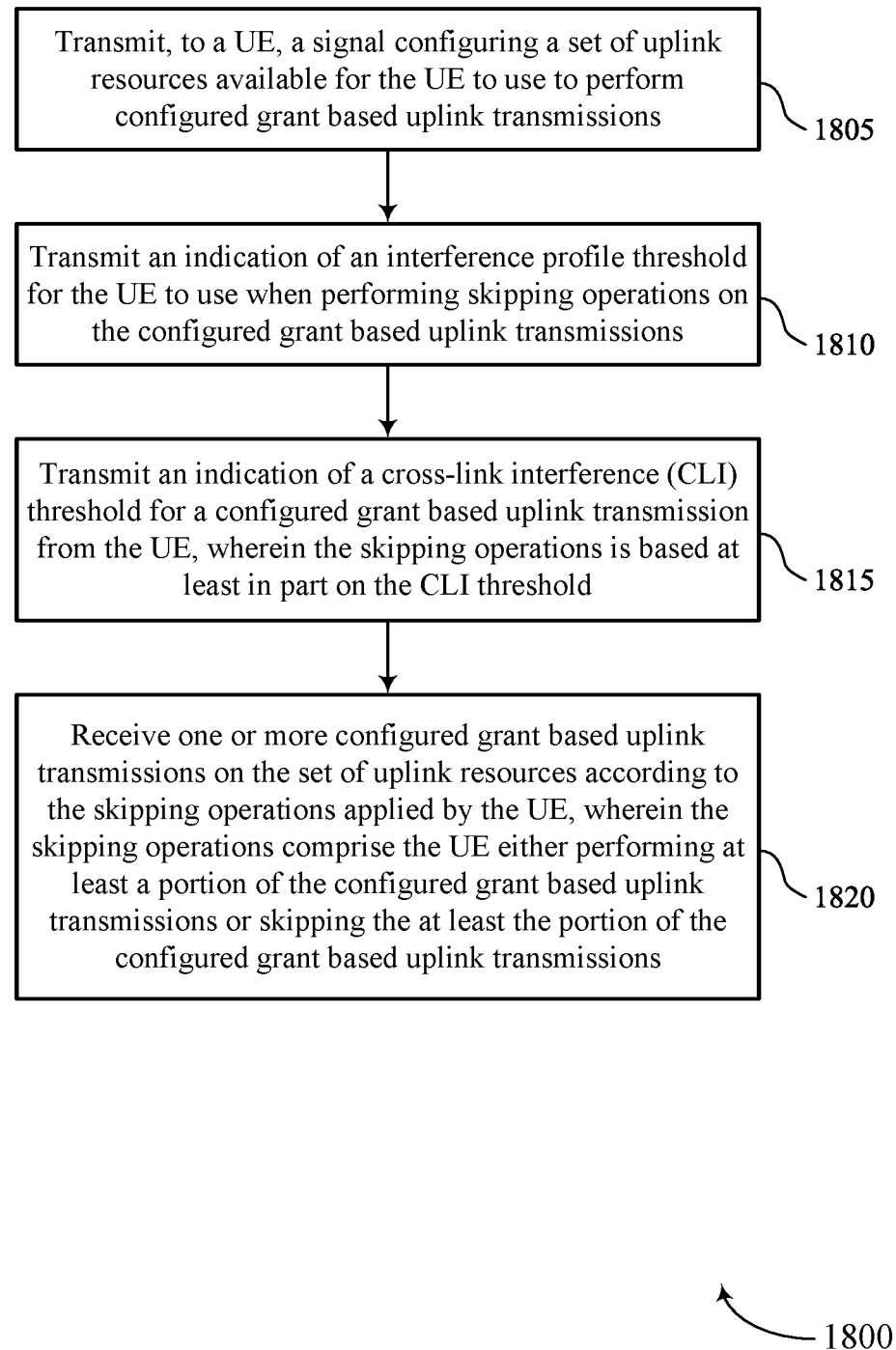

FIG. 18 shows a flowchart illustrating a method 1800 that supports CG skipping and repetition considerations in full-duplex networks in accordance with one or more aspects of the present disclosure. The operations of the method 1800 may be implemented by a network entity or its components as described herein. For example, the operations of the method 1800 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1805, the method may include transmitting, to a UE, a signal configuring a set of uplink resources available for the UE to use to perform CG based uplink transmissions. The operations of 1805 may be performed in accordance with examples as disclosed herein. In some examples, aspects of the operations of 1805 may be performed by a CG manager 1225 as described with reference to FIG. 12.

At 1810, the method may include transmitting an indication of an interference profile threshold for the UE to use when performing skipping operations on the CG based uplink transmissions. The operations of 1810 may be performed in accordance with examples as disclosed herein. In some examples, aspects of the operations of 1810 may be performed by an interference manager 1230 as described with reference to FIG. 12.

At 1815, the method may include transmitting an indication of a CLI threshold for a CG based uplink transmission from the UE, where the skipping operations is based on the CLI threshold. The operations of 1815 may be performed in accordance with examples as disclosed herein. In some examples, aspects of the operations of 1815 may be performed by a CLI manager 1250 as described with reference to FIG. 12.

At 1820, the method may include receiving one or more CG based uplink transmissions on the set of uplink resources according to the skipping operations applied by the UE, where the skipping operations include the UE either performing at least a portion of the CG based uplink transmissions or skipping the at least the portion of the CG based uplink transmissions. The operations of 1820 may be performed in accordance with examples as disclosed herein. In some examples, aspects of the operations of 1820 may be performed by a skipping manager 1235 as described with reference to FIG. 12.

The following provides an overview of aspects of the present disclosure:

Aspect 1: A method for wireless communication at a UE, comprising: determining that an uplink buffer includes data to be communicated in a CG based uplink transmission; identifying an interference profile associated with the UE performing the CG based uplink transmission; and performing a skipping operation for the CG based uplink transmission based at least in part on the data in the uplink buffer and the interference profile, wherein the skipping operation comprises either performing the CG based uplink transmission or skipping the CG based uplink transmission.

Aspect 2: The method of aspect 1, further comprising: identifying a latency parameter, a size parameter, or both, for the data, wherein the skipping operation is further based on the latency parameter, the size parameter, or both, for the data.

Aspect 3: The method of aspect 2, further comprising: receiving an indication of a metric to use when performing the skipping operation, wherein the metric defines the skipping operation as comparing the latency parameter, the size parameter, or both, to the interference profile associated with the UE performing the CG based uplink transmission.

Aspect 4: The method of any of aspects 1 through 3, wherein identifying the interference profile comprises: identifying a SI parameter associated with the UE performing the CG based uplink transmission, wherein the interference profile is based at least in part on the SI parameter.

Aspect 5: The method of aspect 4, further comprising: receiving an indication of a SI threshold for the CG based uplink transmission; and comparing the SI parameter to the SI threshold, wherein the skipping operation is based at least in part on a result of the comparing.

Aspect 6: The method of aspect 5, wherein the skipping operation comprises performing the CG based uplink transmission when the SI parameter is below the SI threshold and skipping the CG based uplink transmission when the SI parameter is at or above the SI threshold.

Aspect 7: The method of any of aspects 4 through 6, further comprising: identifying the SI parameter based at least in part on the UE operating in a full-duplex communication mode concurrently with performing the CG based uplink transmission.

Aspect 8: The method of any of aspects 1 through 7, wherein identifying the interference profile comprises: identifying a CLI parameter associated with the UE performing the CG based uplink transmission at a transmit power level, wherein the interference profile is based at least in part on the CLI parameter.

Aspect 9: The method of aspect 8, further comprising: receiving an indication of a CLI threshold for the configured-grant based uplink transmission; and comparing the CLI parameter for the CG based uplink transmission to the CLI threshold, wherein the skipping operation is based at least in part on a result of the comparing.

Aspect 10: The method of aspect 9, wherein the skipping operation comprises performing the CG based uplink transmission when the CLI parameter for the CG based uplink transmission at the transmit power level is below the CLI threshold and skipping the CG based uplink transmission at the transmit power level when the CLI parameter is at or above the CLI threshold.

Aspect 11: The method of any of aspects 9 through 10, wherein the CLI parameter is based at least in part on a CLI level introduced by the UE performing the CG based uplink transmission at the transmit power level and the CLI threshold defines a maximum transmit power level corresponding to a maximum CLI level.

Aspect 12: The method of any of aspects 8 through 11, further comprising: identifying the CLI parameter based at least in part on one or more neighboring devices operating in a full-duplex communication mode concurrently with the UE performing the CG based uplink transmission.

Aspect 13: The method of any of aspects 1 through 12, further comprising: receiving a signal configuring a set of uplink resources available for the UE to perform CG based uplink transmissions.

Aspect 14: The method of aspect 13, further comprising: identifying, based at least in part on the signal, a metric defining first repetition factor for uplink resources in the set of uplink resources within a full-duplex slot that is different from a second repetition factor for uplink resources in the set of uplink resources within a half-duplex slot.

Aspect 15: The method of any of aspects 13 through 14, further comprising: identifying, based at least in part on the signal, a metric defining a repetition factor for the set of uplink resources based at least in part on a frequency gap between uplink resources for the CG based uplink transmission and downlink resources within a slot.

Aspect 16: The method of aspect 15, wherein the metric comprises at least one of a table defining a fixed relation between the repetition factor and the frequency gap, a weighting factor applied to the frequency gap to define the repetition factor, or both.

Aspect 17: The method of any of aspects 13 through 16, further comprising: identifying, based at least in part on the signal, a metric defining a transmit power level of each CG based uplink transmission repetition, wherein a repetition factor is based at least in part on the transmit power level of each CG based uplink transmission.

Aspect 18: A method for wireless communication at a network entity, comprising: transmitting, to a UE, a signal configuring a set of uplink resources available for the UE to use to perform CG based uplink transmissions; transmitting an indication of an interference profile threshold for the UE to use when performing skipping operations on the CG based uplink transmissions; and receiving one or more CG based uplink transmissions on the set of uplink resources according to the skipping operations applied by the UE, wherein the skipping operations comprise the UE either performing at least a portion of the CG based uplink transmissions or skipping the at least the portion of the CG based uplink transmissions.

Aspect 19: The method of aspect 18, wherein transmitting the indication of the interference profile threshold comprises: transmitting an indication of a metric that defines the skipping operations as the UE comparing a latency parameter, a size parameter, or both, for data in an uplink buffer of the UE to an interference profile associated with the UE performing a CG based uplink transmission.

Aspect 20: The method of any of aspects 18 through 19, wherein transmitting the indication of the interference profile threshold comprises: transmitting an indication of a SI threshold for a CG based uplink transmission from the UE, wherein the skipping operations is based at least in part on the SI threshold.

Aspect 21: The method of any of aspects 18 through 20, wherein transmitting the indication of the interference profile threshold comprises: transmitting an indication of a CLI threshold for a CG based uplink transmission from the UE, wherein the skipping operations is based at least in part on the CLI threshold.

Aspect 22: The method of any of aspects 18 through 21, wherein transmitting the signal configuring the set of uplink resources comprises: transmitting a metric defining first repetition factor for uplink resources in the set of uplink resources within a full-duplex slot that is different from a second repetition factor for uplink resources in the set of uplink resources within a half-duplex slot.

Aspect 23: The method of any of aspects 18 through 22, wherein transmitting the signal configuring the set of uplink resources comprises: transmitting a metric defining a repetition factor for the set of uplink resources based at least in part on a frequency gap between uplink resources for the CG based uplink transmissions and downlink resources within a slot.

Aspect 24: The method of aspect 23, wherein the metric comprises at least one of a table defining a fixed relation between the repetition factor and the frequency gap, a weighting factor applied to the frequency gap to define the repetition factor, or both.

Aspect 25: The method of any of aspects 18 through 24, wherein transmitting the signal configuring the set of uplink resources comprises: transmitting a metric defining a transmit power level of each CG based uplink transmission repetition, wherein a repetition factor is based at least in part on the transmit power level of each CG based uplink transmission.

Aspect 26: An apparatus for wireless communication at a UE, comprising a processor; memory coupled with the processor; and instructions stored in the memory and executable by the processor to cause the apparatus to perform a method of any of aspects 1 through 17.

Aspect 27: An apparatus for wireless communication at a UE, comprising at least one means for performing a method of any of aspects 1 through 17.

Aspect 28: A non-transitory computer-readable medium storing code for wireless communication at a UE, the code comprising instructions executable by a processor to perform a method of any of aspects 1 through 17.

Aspect 29: An apparatus for wireless communication at a network entity, comprising a processor; memory coupled with the processor; and instructions stored in the memory and executable by the processor to cause the apparatus to perform a method of any of aspects 18 through 25.

Aspect 30: An apparatus for wireless communication at a network entity, comprising at least one means for performing a method of any of aspects 18 through 25.

Aspect 31: A non-transitory computer-readable medium storing code for wireless communication at a network entity, the code comprising instructions executable by a processor to perform a method of any of aspects 18 through 25.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a user equipment (UE), comprising:
a processor; and
memory coupled with the processor, with instructions stored in the memory, the instructions being executable by the processor to cause the apparatus to:
determine that an uplink buffer includes data to be communicated in a configured grant based uplink transmission;
identify an interference profile associated with the UE performing the configured grant based uplink transmission; and
perform a skipping operation for the configured grant based uplink transmission based at least in part on the data in the uplink buffer and the interference profile, wherein the skipping operation comprises either performing the configured grant based uplink transmission or skipping the configured grant based uplink transmission.

2. The apparatus of claim 1, wherein the instructions are further executable by the processor to cause the apparatus to:
identify a latency parameter, a size parameter, or both, for the data, wherein the skipping operation is further based on the latency parameter, the size parameter, or both, for the data.

3. The apparatus of claim 2, wherein the instructions are further executable by the processor to cause the apparatus to:
receive an indication of a metric to use when performing the skipping operation, wherein the metric defines the skipping operation as comparing the latency parameter, the size parameter, or both, to the interference profile associated with the UE performing the configured grant based uplink transmission.

4. The apparatus of claim 1, wherein the instructions to identify the interference profile are executable by the processor to cause the apparatus to:
identify a self-interference parameter associated with the UE performing the configured grant based uplink transmission, wherein the interference profile is based at least in part on the self-interference parameter.

5. The apparatus of claim 4, wherein the instructions are further executable by the processor to cause the apparatus to:
receive an indication of a self-interference threshold for the configured grant based uplink transmission; and
compare the self-interference parameter to the self-interference threshold, wherein the skipping operation is based at least in part on a result of the comparing.

6. The apparatus of claim 5, wherein the skipping operation comprises performing the configured grant based uplink transmission when the self-interference parameter is below the self-interference threshold and skipping the configured grant based uplink transmission when the self-interference parameter is at or above the self-interference threshold.

7. The apparatus of claim 4, wherein the instructions are further executable by the processor to cause the apparatus to:
identify the self-interference parameter based at least in part on the UE operating in a full-duplex communication mode concurrently with performing the configured grant based uplink transmission.

8. The apparatus of claim 1, wherein the instructions to identify the interference profile are executable by the processor to cause the apparatus to:
identify a cross-link interference (CLI) parameter associated with the UE performing the configured grant based uplink transmission at a transmit power level, wherein the interference profile is based at least in part on the CLI parameter.

9. The apparatus of claim 8, wherein the instructions are further executable by the processor to cause the apparatus to:
receive an indication of a CLI threshold for the configured-grant based uplink transmission; and
compare the CLI parameter for the configured grant based uplink transmission to the CLI threshold, wherein the skipping operation is based at least in part on a result of the comparing.

10. The apparatus of claim 9, wherein the skipping operation comprises performing the configured grant based uplink transmission when the CLI parameter for the configured grant based uplink transmission at the transmit power level is below the CLI threshold and skipping the configured grant based uplink transmission at the transmit power level when the CLI parameter is at or above the CLI threshold.

11. The apparatus of claim 9, wherein the CLI parameter is based at least in part on a CLI level introduced by the UE performing the configured grant based uplink transmission at the transmit power level and the CLI threshold defines a maximum transmit power level corresponding to a maximum CLI level.

12. The apparatus of claim 8, wherein the instructions are further executable by the processor to cause the apparatus to:
identify the CLI parameter based at least in part on one or more neighboring devices operating in a full-duplex communication mode concurrently with the UE performing the configured grant based uplink transmission.

13. The apparatus of claim 1, wherein the instructions are further executable by the processor to cause the apparatus to:
receive a signal configuring a set of uplink resources available for the UE to perform configured grant based uplink transmissions.

14. The apparatus of claim 13, wherein the instructions are further executable by the processor to cause the apparatus to:
identify, based at least in part on the signal, a metric defining first repetition factor for uplink resources in the set of uplink resources within a full-duplex slot that is different from a second repetition factor for uplink resources in the set of uplink resources within a half-duplex slot.

15. The apparatus of claim 13, wherein the instructions are further executable by the processor to cause the apparatus to:
identify, based at least in part on the signal, a metric defining a repetition factor for the set of uplink resources based at least in part on a frequency gap between uplink resources for the configured grant based uplink transmission and downlink resources within a slot.

16. The apparatus of claim 15, wherein the metric comprises at least one of a table defining a fixed relation between the repetition factor and the frequency gap, a weighting factor applied to the frequency gap to define the repetition factor, or both.

17. The apparatus of claim 13, wherein the instructions are further executable by the processor to cause the apparatus to:
identify, based at least in part on the signal, a metric defining a transmit power level of each configured grant based uplink transmission repetition, wherein a repetition factor is based at least in part on the transmit power level of each configured grant based uplink transmission.

18. An apparatus for wireless communication at a network entity, comprising:
a processor; and
memory coupled with the processor, with instructions stored in the memory, the instructions being executable by the processor to cause the apparatus to:
transmit, to a user equipment (UE), a signal configuring a set of uplink resources available for the UE to use to perform configured grant based uplink transmissions;
transmit an indication of an interference profile threshold for the UE to use when performing skipping operations on the configured grant based uplink transmissions; and
receive one or more configured grant based uplink transmissions on the set of uplink resources according to the skipping operations applied by the UE, wherein the skipping operations comprise the UE either performing at least a portion of the configured grant based uplink transmissions or skipping the at least the portion of the configured grant based uplink transmissions.

19. The apparatus of claim 18, wherein the instructions to transmit the indication of the interference profile threshold are executable by the processor to cause the apparatus to:
transmit an indication of a metric that defines the skipping operations as the UE comparing a latency parameter, a size parameter, or both, for data in an uplink buffer of the UE to an interference profile associated with the UE performing a configured grant based uplink transmission.

20. The apparatus of claim 18, wherein the instructions to transmit the indication of the interference profile threshold are executable by the processor to cause the apparatus to:
transmit an indication of a self-interference threshold for a configured grant based uplink transmission from the UE, wherein the skipping operations is based at least in part on the self-interference threshold.

21. The apparatus of claim 18, wherein the instructions to transmit the indication of the interference profile threshold are executable by the processor to cause the apparatus to:
transmit an indication of a cross-link interference (CLI) threshold for a configured grant based uplink transmission from the UE, wherein the skipping operations is based at least in part on the CLI threshold.

22. The apparatus of claim 18, wherein the instructions to transmit the signal configuring the set of uplink resources are executable by the processor to cause the apparatus to:
transmit a metric defining first repetition factor for uplink resources in the set of uplink resources within a full-duplex slot that is different from a second repetition factor for uplink resources in the set of uplink resources within a half-duplex slot.

23. The apparatus of claim 18, wherein the instructions to transmit the signal configuring the set of uplink resources are executable by the processor to cause the apparatus to:
transmit a metric defining a repetition factor for the set of uplink resources based at least in part on a frequency gap between uplink resources for the configured grant based uplink transmissions and downlink resources within a slot.

24. The apparatus of claim 23, wherein the metric comprises at least one of a table defining a fixed relation between the repetition factor and the frequency gap, a weighting factor applied to the frequency gap to define the repetition factor, or both.

25. The apparatus of claim 18, wherein the instructions to transmit the signal configuring the set of uplink resources are executable by the processor to cause the apparatus to:
transmit a metric defining a transmit power level of each configured grant based uplink transmission repetition, wherein a repetition factor is based at least in part on the transmit power level of each configured grant based uplink transmission.

26. A method for wireless communication at a user equipment (UE), comprising:
determining that an uplink buffer includes data to be communicated in a configured grant based uplink transmission;
identifying an interference profile associated with the UE performing the configured grant based uplink transmission; and
performing a skipping operation for the configured grant based uplink transmission based at least in part on the data in the uplink buffer and the interference profile, wherein the skipping operation comprises either performing the configured grant based uplink transmission or skipping the configured grant based uplink transmission.

27. The method of claim 26, further comprising:
identifying a latency parameter, a size parameter, or both, for the data, wherein the skipping operation is further based on the latency parameter, the size parameter, or both, for the data.

28. The method of claim 27, further comprising:
receiving an indication of a metric to use when performing the skipping operation, wherein the metric defines the skipping operation as comparing the latency parameter, the size parameter, or both, to the interference profile associated with the UE performing the configured grant based uplink transmission.

29. The method of claim 26, wherein identifying the interference profile comprises:
identifying a self-interference parameter associated with the UE performing the configured grant based uplink transmission, wherein the interference profile is based at least in part on the self-interference parameter.

30. A method for wireless communication at a network entity, comprising:
transmitting, to a user equipment (UE), a signal configuring a set of uplink resources available for the UE to use to perform configured grant based uplink transmissions;
transmitting an indication of an interference profile threshold for the UE to use when performing skipping operations on the configured grant based uplink transmissions; and
receiving one or more configured grant based uplink transmissions on the set of uplink resources according to the skipping operations applied by the UE, wherein the skipping operations comprise the UE either performing at least a portion of the configured grant based uplink transmissions or skipping the at least the portion of the configured grant based uplink transmissions.

* * * * *